(12) United States Patent
Li

(10) Patent No.: US 12,019,676 B2
(45) Date of Patent: Jun. 25, 2024

(54) METHOD AND SYSTEM FOR PRESENTING A MULTIMEDIA STREAM

(71) Applicant: Shaofeng Li, Shanghai (CN)

(72) Inventor: Shaofeng Li, Shanghai (CN)

( * ) Notice: Subject to any disclaimer, the term of this patent is extended or adjusted under 35 U.S.C. 154(b) by 343 days.

(21) Appl. No.: 17/540,271

(22) Filed: Dec. 2, 2021

(65) Prior Publication Data

US 2022/0092109 A1 Mar. 24, 2022

Related U.S. Application Data

(63) Continuation of application No. PCT/CN2020/084564, filed on Apr. 13, 2020.

(30) Foreign Application Priority Data

Jun. 3, 2019 (CN) .......................... 201910478502.8

(51) Int. Cl.
*G06F 16/68* (2019.01)
*G06F 16/683* (2019.01)
(Continued)

(52) U.S. Cl.
CPC .......... *G06F 16/686* (2019.01); *G06F 16/683* (2019.01); *G10L 15/02* (2013.01);
(Continued)

(58) Field of Classification Search
CPC ..... G06F 16/686; G06F 16/683; G10L 15/02; G10L 15/083; G10L 2015/025;
(Continued)

(56) References Cited

U.S. PATENT DOCUMENTS 9,984,695 B2 * 5/2018 Thesing .............. G10L 21/0388
11,670,322 B2 * 6/2023 Koretzky ............... G06N 3/045
381/56

(Continued)

FOREIGN PATENT DOCUMENTS

CN 102314917 A 1/2012
CN 103093776 A 5/2013
(Continued)

OTHER PUBLICATIONS

The international search report mailed Jul. 9, 2020 in PCT Application No. PCT/CN2020/084564.

*Primary Examiner* — Phung-Hoang J Nguyen
(74) *Attorney, Agent, or Firm* — Kilpatrick Townsend & Stockton LLP

(57) ABSTRACT

A method for presenting a multimedia stream including a first audio stream and a second audio stream, comprising: receiving the first audio stream, wherein the first audio stream comprises a set of first audio slices sequentially located therein, wherein each first audio slice comprises a timestamp and a grade value; receiving the second audio stream, wherein the second audio stream comprises a set of second audio slices sequentially located in the second stream, and aligned in time with one of the first audio slice; presenting the first audio stream according to the timestamp of the first set of first audio slices; receiving a set of control commands including a first threshold value; determining whether the first threshold value is lower than the grade value of the first audio slice; and presenting the second audio slice aligned with the first audio slice.

12 Claims, 15 Drawing Sheets

(51) Int. Cl.
*G10L 15/02* (2006.01)
*G10L 15/08* (2006.01)

(52) U.S. Cl.
CPC ...... *G10L 15/083* (2013.01); *G10L 2015/025* (2013.01); *G10L 2015/027* (2013.01)

(58) Field of Classification Search
CPC . G10L 2015/027; G10L 15/005; G10L 25/60; G10L 15/04; G10L 15/26; G10L 25/54; G09B 5/065; H04N 21/4307; H04N 21/462; H04N 21/478; H04N 21/8456
See application file for complete search history.

(56) References Cited

U.S. PATENT DOCUMENTS

2004/0069126 A1* 4/2004 Ludwig ................ G06F 3/041
  84/645
2007/0212015 A1   9/2007 Green

FOREIGN PATENT DOCUMENTS

| | | |
|---|---|---|
| CN | 105791971 A | 7/2016 |
| CN | 105872687 A | 8/2016 |
| CN | 108810575 A | 11/2018 |
| CN | 109640165 A | 4/2019 |
| WO | 2004109679 A1 | 12/2004 |

\* cited by examiner

METHOD AND SYSTEM FOR PRESENTING A MULTIMEDIA STREAM

CROSS-REFERENCES TO RELATED APPLICATIONS

This application is a continuation in part of International Application No. PCT/CN2020/084564, filed on Apr. 13, 2020, entitled "PLAYING CONTROL METHOD AND SYSTEM FOR AUTOMATICALLY SWITCHING AUDIOS AND VIDEOS ACCORDING TO LANGUAGE SMALLEST UNIT", which claims the priority to Chinese Patent Application No. 201910478502.8, filed on Jun. 3, 2019, entitled "PLAYING CONTROL METHOD AND SYSTEM FOR AUTOMATICALLY SWITCHING AUDIOS AND VIDEOS ACCORDING TO LANGUAGE SMALLEST UNIT," the disclosures of which are hereby incorporated by reference in their entireties for all purposes.

BACKGROUND OF THE INVENTION

In foreign language education for children, it is advantageous to provide massive foreign language information to create an immersed environment for children because children's concentration on learning materials cannot last long, and they often feel boring about a single learning material. Thanks to the rapid development of the Internet, a huge amount of children's cartoons or story videos are easily accessible over in the Internet. These children's cartoons and story videos provide excellent resources for foreign language education because they can hold the children's attention longer. However, a conventional method using children's cartoons and story video in foreign language education needs improvement.

BRIEF SUMMARY OF THE INVENTION

One aspect of the present disclosure provides a method for presenting a multimedia stream including a set of audio streams, wherein the set of audio streams comprise a first audio stream and a second audio stream having different content from the first audio stream, the method comprising: receiving the first audio stream, wherein the first audio stream comprises a set of first audio slices sequentially located in the first audio stream, wherein each first audio slice comprises a time stamp and a grade value; receiving the second audio stream, wherein the second audio stream comprises a set of second audio slices sequentially located in the second stream, wherein each of the second audio slice is aligned in time with one of the first audio slice; presenting the first audio stream according to the time stamp of the first set of first audio slices; receiving a set of control commands, wherein the set of control commands comprises a first threshold value; determining whether the first threshold value is lower than the grade value of the first audio slice; and in response to the determination that the first threshold value is lower than the grade value of the first audio slice, presenting the second audio slice aligned with the first audio slice.

According to some embodiments of the present disclosure, the set of control commands comprises a second threshold value greater than the first threshold value, the method further comprises: determining whether the second threshold value is greater than the grade value of the first audio slice; and in response to the determination that the second threshold value is greater than the grade value of the first audio slice, receiving a third audio slice.

According to some embodiments of the present disclosure, the method further comprises: determining whether the third audio slice matches with the first audio slice; in response to the determination that the third audio slice matches with the first audio slice, updating the first threshold value to a higher value.

According to some embodiments of the present disclosure, the set of control commands comprises a counter value, and the method further comprises: determining whether the third audio slice matches with the first audio slice; in response to the determination that the third audio slice matches with the first audio slice, updating the counter value.

According to some embodiments of the present disclosure, the method further comprises: determining whether the counter value is greater than a predetermined value; in response to the determination that the third audio slice matches with the first audio slice, updating the first threshold value to a higher value.

Another aspect of the present disclosure provides a system for presenting a multimedia stream including a set of audio streams, wherein the set of audio streams comprise a first audio stream and a second audio stream having different content from the first audio stream, the system comprising one or more processor configured to execute machine-readable instructions to cause the system to perform: receiving the first audio stream, wherein the first audio stream comprises a set of first audio slices sequentially located in the first audio stream, wherein each first audio slice comprises a time stamp and a grade value; receiving the second audio stream, wherein the second audio stream comprises a set of second audio slices sequentially located in the second stream, wherein each of the second audio slice is aligned in time with one of the first audio slice; presenting the first audio stream according to the time stamp of the first set of first audio slices; receiving a set of control commands, wherein the set of control commands comprises a first threshold value; determining whether the first threshold value is lower than the grade value of the first audio slice; and in response to the determination that the first threshold value is lower than the grade value of the first audio slice, presenting the second audio slice aligned with the first audio slice.

According to some embodiments of the present disclosure, the set of control commands comprises a second threshold value greater than the first threshold value, the system is configured to further perform: determining whether the second threshold value is greater than the grade value of the first audio slice; and in response to the determination that the second threshold value is greater than the grade value of the first audio slice, receiving a third audio slice.

According to some embodiments of the present disclosure, the system is configured to further perform: determining whether the third audio slice matches with the first audio slice; in response to the determination that the third audio slice matches with the first audio slice, updating the first threshold value to a higher value.

According to some embodiments of the present disclosure, the set of control commands comprises a counter value, and the system is configured to further perform: determining whether the third audio slice matches with the first audio slice; in response to the determination that the third audio slice matches with the first audio slice, updating the counter value.

According to some embodiments of the present disclosure, the system is configured to further perform: determining whether the counter value is greater than a predetermined value; in response to the determination that the third audio slice matches with the first audio slice, updating the first threshold value to a higher value.

Another aspect of the present disclosure provides a method for processing an audio stream, the method comprising: receiving the audio stream, wherein the audio stream comprises a set of first audio slices sequentially located in the audio stream, wherein each first audio slice comprises a timestamp; performing automatic speech recognition, based on the time stamp, on the first audio slice to generate a first text data; processing the first text data to obtain a feature vector; determining a feature score for characterizing the first audio slice based on the feature vector; determining that the feature score is greater than a predetermined threshold; and updating the audio stream by replacing the first audio slice with a second audio slice having different content from the first audio slice.

According to some embodiments of the present disclosure, the second audio slice has the same duration as the first audio slice.

According to some embodiments of the present disclosure, the feature vector comprises a first weight assigned to each of the first features, wherein determining a feature score for characterizing the first audio slice based on the feature vector, comprises: determining the feature score based on an average of the sum of the first feature multiplied with the first weight.

According to some embodiments of the present disclosure, the method further comprises: storing the updated audio stream in a storage medium as a separate audio stream.

According to some embodiments of the present disclosure, the method further comprises: receiving a control command for presenting the audio stream, wherein the control command comprises a grade value; determining that the grade value corresponds to the predetermined threshold; and presenting the updated audio stream.

According to some embodiments of the present disclosure, determining the feature score for characterizing the first audio slice based on the feature vector comprises: applying a random forest model to the feature vector to generate a output of the random forest model; determining the feature score based on the output of the random forest model.

According to some embodiments of the present disclosure, determining the feature score for characterizing the first audio slice based on the feature vector comprises: applying a recurrent neural network (RNN) model to the feature vector to generate a output of the RNN model; determining the feature score based on the output of the RNN model.

Numerous benefits may be provided by the present disclosure over conventional techniques. For example, some embodiments of the present disclosure provide a method for presenting a multimedia stream having audio streams in a native language and foreign language, which can switch the performance of audio streams between the two languages according to the progress level of a user. Difficulty audio slice in a foreign language over the progress level of the user may be replaced by audio slice in the native language. It may improve user experience in learning a foreign language. For example, some embodiments of the present disclosure provide a method for processing a multimedia stream having an audio stream in a foreign language, which can classify the audio slices in the audio stream to different levels according to a feature vector. The audio slices with a difficulty level higher than a predetermined progress level can be replaced by a replacement audio slice in the native language. A user may selectively play the mixed audio stream based on his progress level. These and other embodiments of the invention along with many of its advantages and features are described in more detail in conjunction with the text below and attached figures.

DETAILED DESCRIPTION OF THE INVENTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following detailed description, numerous specific details are set forth in order to provide a more thorough understanding of the present disclosure. However, it will be apparent to one skilled in the art that the present disclosure may be practiced without necessarily being limited to these specific details. In other instances, well-known structures and devices are shown in block diagram form, rather than in detail, in order to avoid obscuring the present disclosure.

With the development of computer and network technologies, many self-education approaches are provided for out-of-class language education. For example, a user can play a foreign movie using his/her mobile phone and educate himself/herself the foreign language skills. The user can improve his listening skills by watching the movie. At the same time, the user may read actor's lines to practice the spoken skills. The user can repeat this process for improvement. However, the user cannot interactively customize the learning materials based on his progress in the learning curve using such conventional approaches.

Figure 1:
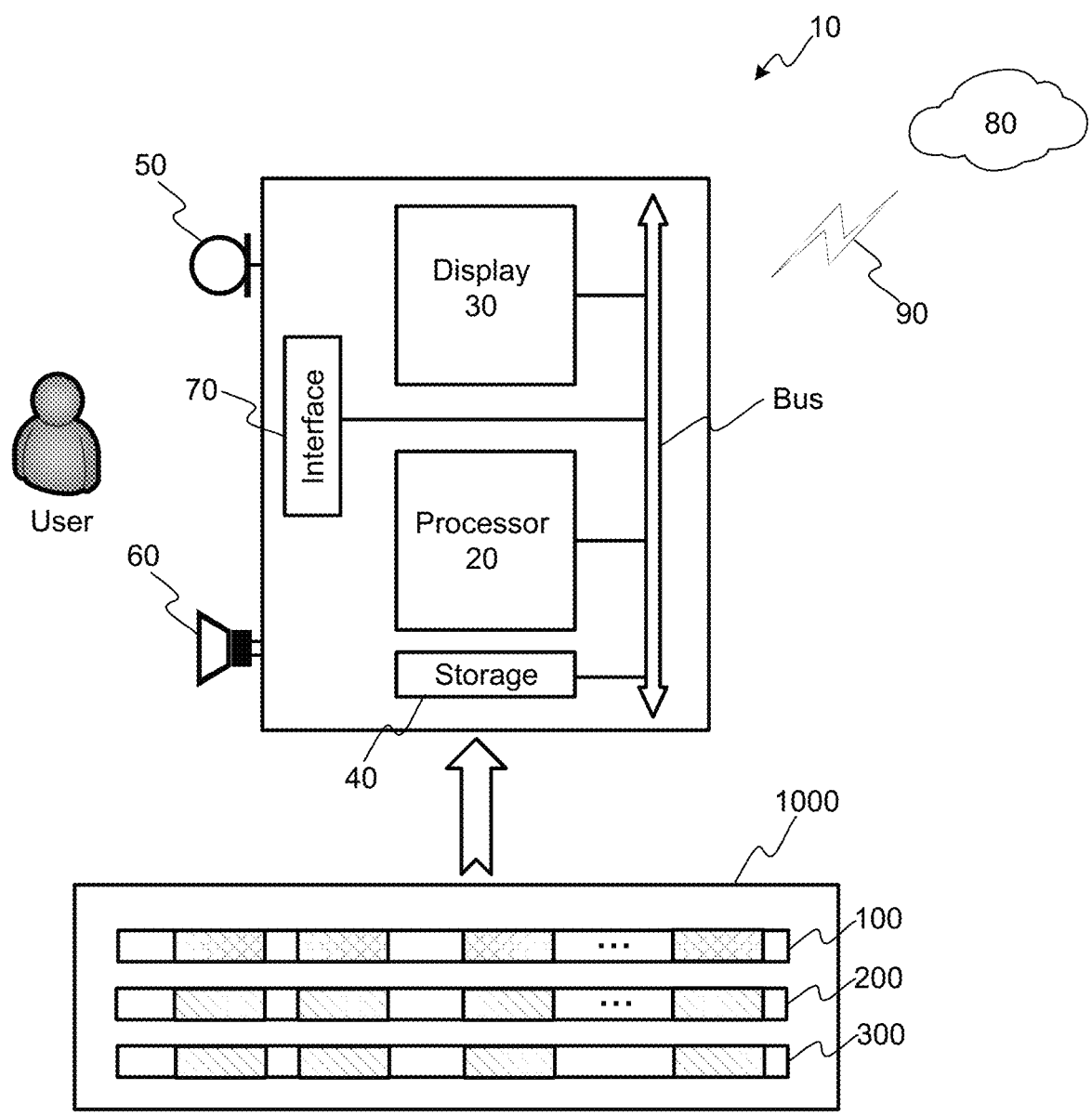
FIG. 1 is the diagram system for presenting and controlling a multimedia stream according to some embodiments of the present disclosure.

FIG. 1 is the diagram system 10 for presenting and controlling a multimedia stream 1000 according to some embodiments of the present disclosure. As shown in FIG. 1, system 10 may include a processor 20, a display 30, a storage 40, a microphone 50, a speaker 60, and an interface 70. These components may be interconnected by a communication bus. In some embodiments, storage 40 is configured to store instructions that, when executed by processor 20, cause processor 20 to implement the method or operation as disclosed herein. Storage 40 is also configured to store multimedia stream 1000. In some embodiments, storage 40 may include a non-transitory memory. In some embodiments, multimedia stream 1000 includes a first audio stream 100 and a second audio stream 200. In some embodiments, multimedia stream 100 may also include an optional video stream 300. Processor 20 may process multimedia stream 1000 and send multimedia stream 1000 to display 30 for displaying video stream 300, and send multimedia stream 1000 to speaker 60 to play first audio stream 100 and second audio stream 200.

In some embodiments, multimedia stream 1000 may be stored in a cloud 80 that is connected with system 10 through wired or wireless network link 90. It allows the system to access massive multimedia contents for foreign language education.

As shown in FIG. 1, system 10 may also include a microphone 50 to receive voice input from a user. In some embodiments, system 10 may include an interface 70 to receive a set of control commands input from the user. Processor 20 may control the presentation of multimedia stream 1000 based on the set of control commands.

Figure 2:
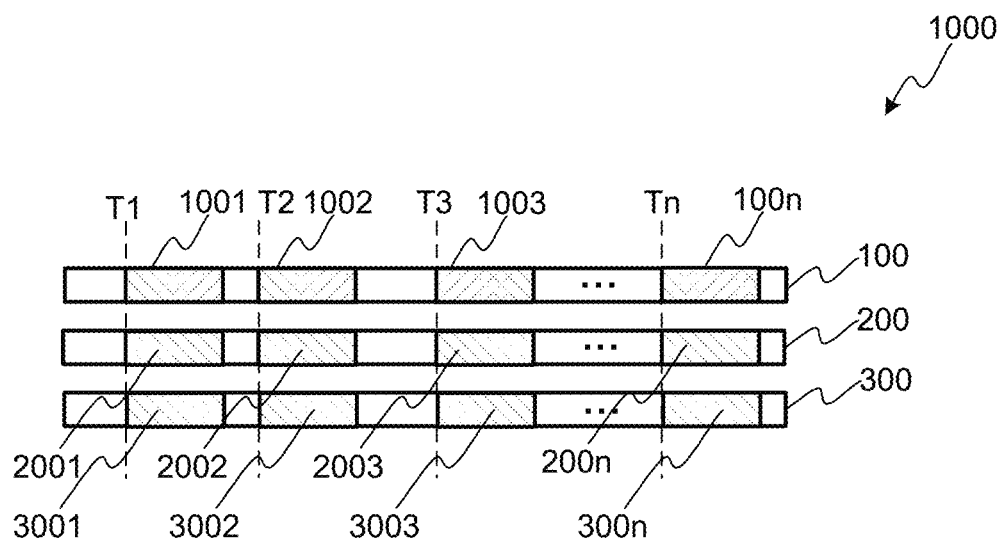
FIG. 2 is a diagram illustrating the structure of the multimedia stream according to some embodiments of the present disclosure.

FIG. 2 is a diagram illustrating the structure of multimedia stream 1000 according to some embodiments of the present disclosure. As shown in FIG. 2, in some embodiments, audio stream 100 may include a plurality of first audio slices 1001, 1002, . . . 100n sequentially located in audio stream 100. As used herein, the symbol "n" represents that the audio slices may include as many audio slices as appropriate for a particular application. It should not be construed as limiting the present disclosure to a specific number. Audio stream 100 may include voice content in the first language, such as English. Audio stream 200 includes a plurality of second audio slices 2001, 2002, . . . 200n sequentially located in audio stream 200. Audio stream 200 may include voice content in the second language, such as Chinese. In some embodiments, each first audio slice 1001-100n of the first audio stream is timely aligned with a respective second audio slice 2001-200n of second audio stream 200 through timestamps T1, T2, . . . Tn. For example, multimedia stream 1000 may include an episode of the cartoon, such as Peppa Pig. In this case, first audio stream 100 includes the voice in English, while second audio stream 100 includes the voice in Chinese. In this example, the user, a kid of five years old and a native speaker of Chinese, learns some English through watching the cartoon. Each first audio slice 1001-100n may represent the actor's lines or characters' dialog in English, while each second audio slice 2002-200n may represent corresponding actor's lines or characters' dialog in Chinese.

In some embodiments, each first audio slice 1001-100n may include its respective timestamp T1-Tn. Similarly, each second audio slice 2001-200n may include its respective timestamp T1-Tn. In some other embodiments, timestamp T1-Tn may be stored in a separate file in storage 40.

In some embodiments, each first audio slice 1001-100n may include a set of features characterizing the content of the respective first audio slices 1001-100n. For example, the set of features may include a grade value indicating the difficulty level of the respective first audio slices 1001-100n. Optionally, each second audio slice 2001-200n may include a set of features characterizing the content of the respective second audio slices 2001-200n. For example, the set of features may include a grade value indicating the difficulty level of the respective second audio slices 1001-100n. In some embodiments, the grade value for each first audio slice 1001-100n is predetermined, taking into account of multiple factors, such as the number of words, the word frequency, etc. In some embodiments, the grade value is determined using a method according to some embodiments discussed below in detail.

In some embodiments, the grade value for first audio slices 1001-100n can be assigned a number between one to ten. For example, a first audio slice representing a sentence like "I want an apple" may have a grade value of two, while a first audio slice representing a sentence like "I will study astronomy" may have a grade value of seven. It should be noted that the grade value is not limited to the illustrative range of one to ten. In some embodiments, the grade value may be assigned as Very Easy, Easy, Intermediate, Difficult, Very Difficult, and Master.

In some embodiments, system 10 may be operable to play first audio stream 100 and/or second audio stream 200 based on the time stamp T1-Tn. Optionally, system 10 may be operable to play video stream 300 together with first audio stream 100 and/or second audio stream 200. For example, video stream 300 may help focus the user's attention on the multimedia stream 100 to prevent external distractions.

Figure 3:
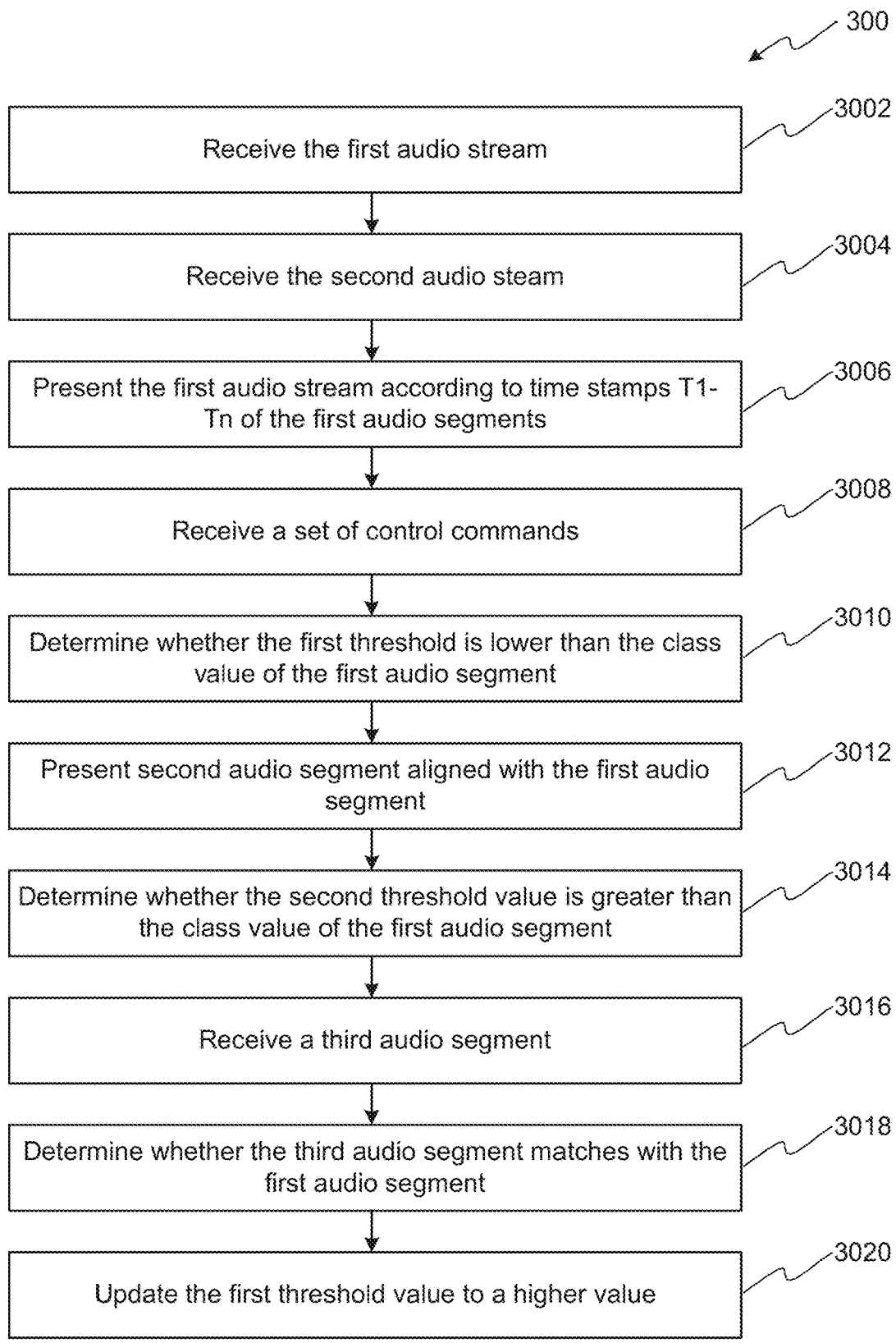
FIG. 3 is a flowchart illustrating a method for presenting a multimedia stream according to some embodiments of the present disclosure.

FIG. 3 is a flowchart illustrating a method 300 for presenting a multimedia stream according to some embodiments of the present disclosure. In some embodiments, method 300 may be implemented using system 10 as shown in FIG. 1. Therefore, method 300 is described with reference to both FIG. 1 and FIG. 3. It should be noted that method 300 may also be implemented on another computer systems that different from the system 10 shown in FIG. 1.

In some embodiments, method 300 may include receiving (3002) the first audio stream 100, and receiving (3004) the second audio stream 200. Specifically, as shown in FIG. 1, processor 20 may operate to retrieve multimedia stream 1000 from storage 40. In some other embodiments, processor 20 may operate to retrieve multimedia stream 1000 from cloud 80 through network link 90.

Then method 300 may include presenting (3006) the first audio stream 100 according to timestamps T1-Tn of the first audio slices 1001-100n. Specifically, processor 20 may operate to send first audio stream 100 to speaker 60 to play the voice content of first audio stream 100.

Next, method 300 may include receiving (3008) a set of control commands. In some embodiments, the set of control commands include a first threshold value indicating the level of study the user wishes to practice this time. In the description below, the first threshold value may also be used to indicate the user's level in mastering the first language. Specifically, in some embodiments, system 10 may receive a control command input by the user through interface 70 as shown in FIG. 1. For example, interface 70 may include a remote with buttons configured to input a signal, or a touch screen for receiving a finger touch. For example, system 10 may operate to display a menu including Grade 1 to Grade 10 on display 30, and prompt the user to select one by pressing a button on a remote, or by touching the screen with a finger to input a selection. For example, the user selects Grade 5. It should be noted that receiving the set of control commands may be performed before presenting the first audio stream 100 in some other embodiments.

Next, method 300 may include determining (3010) whether the first threshold is lower than the grade value of the first audio slice within first audio stream 100. Specifically, for example, as the progress of play for first audio stream 100 proceeds to timestamp T1, processor 20 is operable to compare the first threshold with the grade value of first audio slice 1001 of first audio stream 100. For example, the grade value of first audio slice 1001 is seven while the first threshold is five. It shows that the difficulty level of first audio slice 1001 is higher than the progress level. It may not be helpful to play first audio slice 1001 to the user, otherwise the user may lose interest in learning foreign language. For example, a child learning English by watching Peppa Pig may lose his interest if he could not follow what is talking about by Peppa. In this case, some embodiments of the present disclosure propose to replace first audio slice 1001 with a corresponding second audio slice 2001, which includes voice content in the second language, such as the user's mother tongue Chinese.

Accordingly, method 300 may further include: in response to the determination that the first threshold value is lower than the grade value of the first audio slice 1001, presenting (3012) second audio slice 2001 aligned with the first audio slice 1001. In some embodiments, first audio slice 1001 and second audio slice 2001 are timely aligned based on timestamp T1. It makes it possible to seamlessly switch between first audio slice 1001 and second audio slice 2001.

In some embodiments, if the first threshold value is greater or equal to the grade value of first audio slice 1001, it shows that the user already has the skills, or the user thinks he has the skills by selecting the first threshold value, to understand the content of first audio slice 1001. The performance of first stream 100 can continue. Specifically, method 300 may include continuing to present first audio slice 1001.

In some embodiments, system 10 may be prepared in advance of playing the next first audio slice to determine whether switching is needed. For example, method 300 may further include determining whether the first threshold value is lower than the grade value of another first audio slice 1002 immediately subsequent to first audio slice 1001. Then, in response to the determination that the first threshold value is lower than the grade value of first audio slice 1002, the method may further include reading the corresponding second audio slice 2002 into a cache optionally included in system 10 to get ready for playing second audio slice 2002.

In some other embodiments, system 10 may generate a new audio stream using first audio slices 1001-100n and second audio slice 2001-200n based on the comparison between first threshold value and the grade values included in first audio slices 1001-100n. For example, it is determined that first threshold value is greater than the grade values of first audio slice 1001, first audio slice 1003, and first audio slice 1005, while first threshold value is lower than the grade values of first audio slice 1002, first audio slice 1004, and first audio slice 1006. Then the performance of first audio slice 1002, first audio slice 1004, and first audio slice 1006 will be replaced by corresponding second audio slice 2002, second audio slice 2004, and second audio slice 2006. The method may further include generating third audio stream 300 by splicing sequentially first audio slice 1001, second audio slice 2002, first audio slice 1003, second audio slice 2004, first audio slice 1005, and second audio slice 2006. In some examples, the audio portion between adjacent first audio slices could be spliced into the third audio stream 300 according to their positions in the first audio stream 100. FIG. 3 shows a third audio stream 300 generated according to some embodiments of the present disclosure. In some embodiments, third audio stream 300 may be stored in storage 40 as shown in FIG. 1 and marked with the first threshold value. The user may play third audio stream 300 based on the first threshold value if he wants to review it later.

In some embodiments, the progress level indicated by the first threshold value can be modified according to the learning progress of the user. For example, the usage of time of a given user may be recorded and stored in a database. When the given user uses the system to practice foreign language, the system may retrieve the given user's record from the database. After each usage, the system may update the time of usage for this given user. If the time of usage for this given user has exceed a certain amount, then the progress level could be increased. Specifically, in some embodiments, the set of control command may include a time of usage value, which may be retrieved from a database. In this case, method 300 may include: recording the time of presenting the multimedia stream 1000; and updating the time of usage value based on the time of presenting the multimedia stream 1000.

Then, method 300 may include determining whether the time of usage value is greater than a predetermined third value; and in response to the determination that the time of usage value is greater than the predetermined third value, updating the first threshold value to a higher value.

In some embodiments, the present disclosure proposes an interactive playing control method used in presenting multimedia stream 100. Specifically, the set of control commands received from the user may include a second threshold value. For example, the second threshold value may indicate the familiarity degree the user thinks he can use the foreign language. For example, the user input the second threshold value as four, which means the user is confident that he could manage to speak English under difficulty level three. In some embodiments, method 300 may further include determining (3014) whether the second threshold value is greater than or equal to the grade value of the first audio slice 1002. For example, first audio slice 1002 includes a difficulty level of four, which is equal to the familiarity degree of the user indicated by the second threshold value. Then, system 10 may prompt the user to speak the content of first audio slice 1002. Accordingly, method 300 may further include: in response to the determination that the second threshold value is greater than the grade value of the first audio slice 1002, receiving (3016) a third audio slice. For example, system 10 may obtain the user's voice input through microphone 50 as shown in FIG. 1, and store the user's voice input as the third audio slice in storage 40.

In some embodiments, system 10 may update the progress level as indicated by the first threshold value input by the user. For example, if the content of the third audio slice matches that of the first audio slice 1002 to a predetermined confidence range, system 10 may increase the progress level of the user. In some embodiments, method 300 may further include determining (3018) whether the third audio slice matches with the first audio slice 1002; and in response to the determination that the third audio slice matches with the first audio slice 1002, updating (3020) the first threshold value to a higher value. For example, the current progress level of the user indicated by the first threshold value is five, and the user satisfactorily speak a line contained in first audio slice 1002. Then, system 10 may update the first threshold value to six. It means the user makes progress in the learning curve.

In some embodiments, the progress level of a given user may be updated according to the time in which the given user has spoken the third audio slice. In some embodiments, the set of control command comprises a time of interaction value, which is configured to indicate the amount of sentences the given user has spoken. In this case, method 300 may include recording a duration time of the third audio slice; and updating the time of interaction value based on the duration time of the third audio slice.

In some embodiments, method 300 may further include determining whether the time of interaction value is greater than a predetermined first value; and in response to the determination that the time of interaction value is greater than the predetermined first value, updating the first threshold value to a higher value.

In some embodiments, system 10 may update the progress level after a few times that the user satisfactorily speaks the lines in the first audio stream to avoid the situation in which the user happens to speak a line correctly but not actually makes that progress. In some embodiments, the set of control commands may include a counter value. Method 300 may further include determining whether the third audio slice matches with the first audio slice; and in response to the determination that the third audio slice matches with the first audio slice, updating the counter value. For example, the initial counter value may be set to zero, and if the user satisfactorily speaks the line contained in first audio slice 1002 to a predetermined confidence range, then system 10 may increase the counter value to one.

In some embodiments, system 10 may update the progress level after the counter value is greater than three. Accordingly, method 300 may further include determining whether the counter value is greater than a predetermined second value; and in response to the determination that the third audio slice matches with the first audio slice, updating the first threshold value to a higher value. For example, the predetermined first value is three. It means that system 10 determined that the user has satisfactorily speak the lines contained in first audio stream 100 for three times. Then, system 10 may update the first threshold value to six.

Each user may stay at a different progress level in learning a foreign language. Customized education contents play a vital role in improving the learning efficiency of different users. Different users may find some multimedia resource, for example, a favorite movie, is especially suitable for learning the language style represented by a special character in the movie.

Conventional foreign language education system could not provide an efficient way to use a particular education resource. In another aspect of the present disclosure, a method for processing an audio stream is proposed. The method is configured to process a given multimedia stream in order to turn the audio stream included therein into an education resource for users staying at different progress levels.

Figure 4:
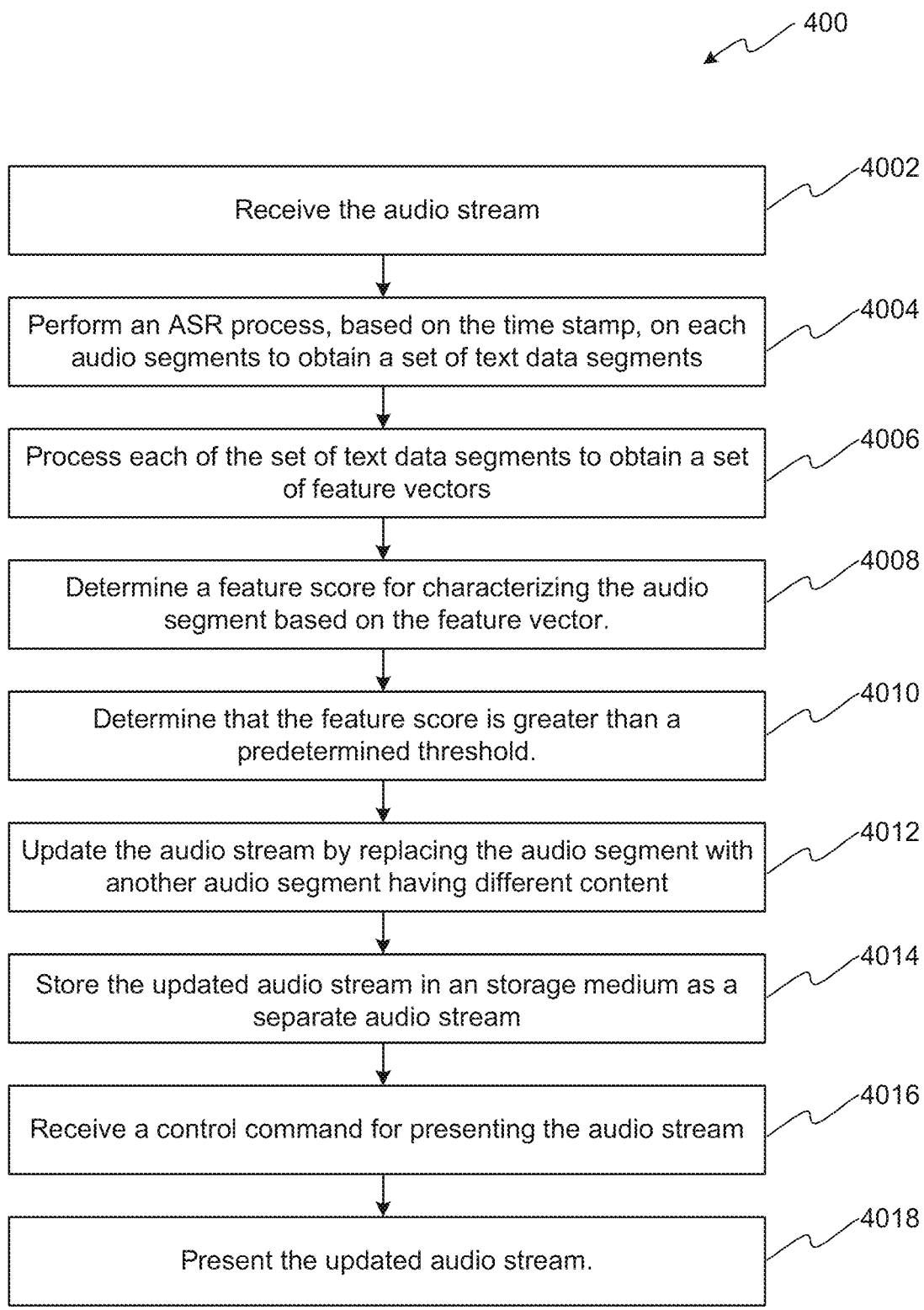
FIG. 4 is a flowchart illustrating a method for processing a multimedia stream according to some embodiments of the present disclosure.

FIG. 4 is a flowchart illustrating a method 400 for processing a multimedia stream 2000 (shown in FIG. 5) according to some embodiments of the present disclosure. In some embodiments, method 400 may be implemented using system 10 as shown in FIG. 1.

Accordingly, method 400 will be described with reference to system 10 as shown in FIG. 1. It should be noted that method 400 may also be implemented using another computer system different from system 10.

Figure 5:
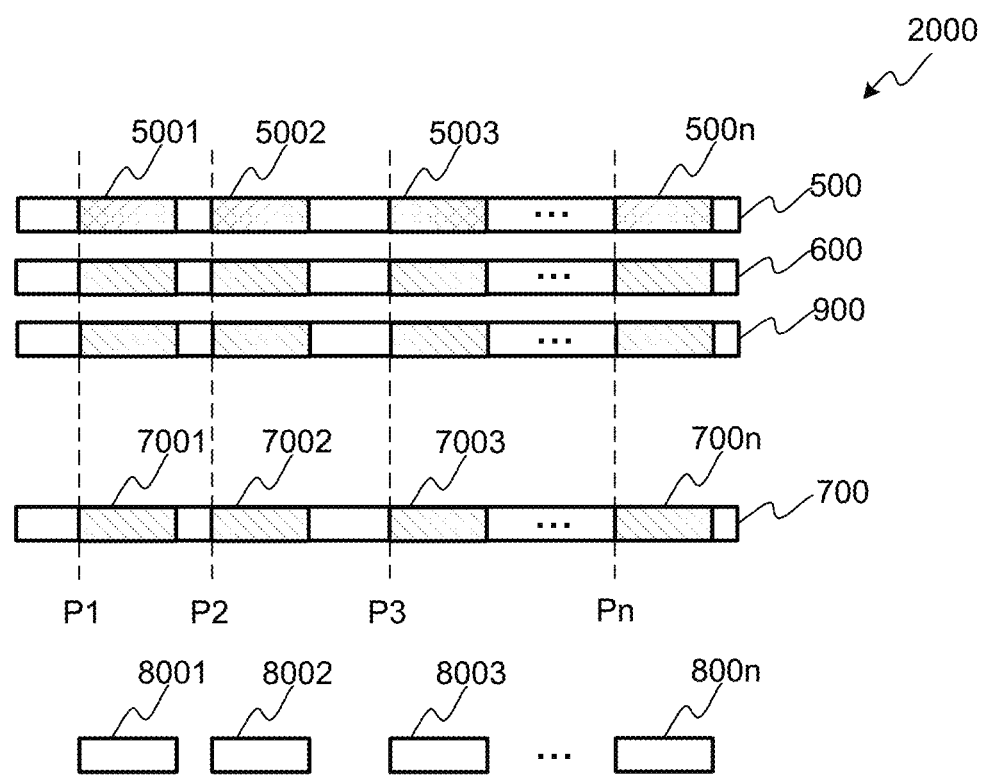
FIG. 5 is a diagram illustrating the structure of the multimedia stream according to some embodiments of the present disclosure.

As shown in FIG. 5, in some embodiments, multimedia stream 2000 may include an audio stream 500. Optionally, multimedia stream 2000 may include a video stream 600. Optionally, multimedia stream 2000 may include a third audio stream 900.

As shown in FIG. 4, method 400 may include receiving (4002) audio stream 500. In some embodiments, audio stream 500 may include a set of audio slices 5001-500*n*. Each audio slice 5001-500*n* may include a respective timestamp P1-Pn. In some embodiments, audio stream 500 may not include timestamps for the set of audio slices 5001-500*n*. In this case, method 400 may include performing an automatic speech recognition process to audio stream 500 in order to identify a set of timestamps characterizing the beginning of each audio slices 5001-500*n*.

Automatic speech recognition (ASR) is an area of technology that transforms the lexical content of human speech into an input form (e.g., a character string) that can be read by computers. The process of automatic speech recognition typically includes several operations, including: generating a language model that contains a plurality of words in a corpus, training an acoustic model to create statistical representations of one or more contrastive units of sound (called "phonemes" or simply "phones") that make up each word in the corpus, building a decoding network (sometimes called a "decoding resource network) using the language model and the acoustic model, and finally decoding human speech. There are many conventional ASR models may be used in implementing embodiments of the discussed in the present disclosure. One example of a commercial ASR system may be available from iFLYTEK Corporation.

In some embodiments, method 400 may include performing (4004) an ASR process, based on the timestamp, on each audio slice 5001-500*n* of audio stream 500 to obtain a set of text data slices 7001-700*n* corresponding to the set of audio slices 5001-500$n$. In some embodiments, the set of text data slices 7001-700$n$ may be stored as a separate file in storage 40.

Then method 500 may include processing (4006) each of the set of text data slices 7001-700$n$ to obtain a set of feature vectors 8001-800$n$, each of which characterizes a respective text data slices 7001-700$n$. Due to the correspondence relationship, each of the set of feature vectors 8001-800$n$ can also characterize a respective audio slice 5001-500$n$.

In some embodiments, the feature vector may include a model having a plurality of parameters for characterizing a given audio slice and the text data slice generated by the ASR process. In some embodiments, the model may include multiple parameters in Category I, which includes the duration of an audio slice (p1); the number of words contained in the text data slice corresponding to the audio slice (p2); the number of syllables contained in the text data slice corresponding to the audio slice (p3), the number of phonemes contained in the text data slice corresponding to the audio slice (p4); the number of phones contained in the text data slice corresponding to the audio slice (p5), the number of letters contained in the text data slice corresponding to the audio slice (p6). It should be noted, the above parameters in Category I are provided for illustrative purpose and should not be construed as limiting the present disclosure as provided above.

The terms "syllable," "phoneme", and "phone" described in the present disclosure should be construed to have their ordinary meaning in the art. As used herein, "syllable" means a unit of human speech that is interpreted by the listener as a single sound, although syllables usually consist of one or more vowel sounds, either alone or combined with the sound of one or more consonants; a word consists of one or more syllables. As used herein, "phoneme" means an indivisible unit of sound in a given language. A phoneme is an abstraction of the physical speech sounds (phones) and may encompass several different phones. As used herein, "phone" means any distinct speech sound or gesture, regardless of whether the exact sound is critical to the meanings of words.

There are conventional databases available to represent a given word in terms of syllable, phoneme, and phone. For example, the word "please" may be represented to include 1 syllable, or 3 phonemes, or 5 phones in an example database. As another example, the sentence "How are you" may include 3 syllables, or 3 phonemes, or 6 phones.

In some embodiments, a text data slice, for example, text data slice 7001 corresponding to audio slice 5001 could be characterized by the number of syllables, the number of phonemes, or the number of phones.

It can be seen that the larger the parameters in Category I, the more difficult the audio slice.

In some embodiments, the feature vector may include a plurality of parameters in Category II, which includes the clarity degree of the audio slice (q1); the speech speed of the speaker in the audio slice (q2); the intonation of the audio slice (q3); the characteristic feature of the speaker in the audio slice (q4); the intensity of the background noise in the audio slice (q5). As used herein, the clarity degree of the audio slice (q1) represents the clarity or recognizability of the speech contained in the audio slice. As used herein, the intonation of the audio slice (q3) represents the impact caused for understanding the speech by the change of intonation occurred in the speech contained in the audio slice. As used herein, the characteristic feature of the speaker in the audio slice (q4) represents the impact caused for understanding the speech by the difference between speakers occurred in the speech contained in the audio slice. It should be noted, the above parameters in Category II are provided for illustrative purposes and should not be construed as limiting the present disclosure as provided above.

In some embodiments, empirical models can be used to evaluate a given audio slice in terms of the plurality of parameters in Category II.

In some embodiments, the feature vector may include a plurality of parameters in Category III, which includes the frequency of each word contained in the audio slice (s1); the necessity degree of the content contained in the audio slice in predetermined pedagogics (s2); the lip profile score characterizing pronunciation of the content contained in the audio slice (s3); and the muscle profile score characterizing the pronunciation of the content contained in the audio slice (s4). As used herein, the predetermined pedagogics may include, for example, different textbooks used in different areas of China, or the pedagogics developed by Cambridge University or other linguistic study institutions. As used therein, the lip profile score characterizing pronunciation of the content contained in the audio slice (s3) may represent the difficulty for users speaking various languages in learning a given foreign language, such as, English. As used herein, the muscle profile score characterizing the pronunciation of the content contained in the audio slice (s4) represents the adaptability for users speaking various languages to a given foreign language, such as, English. It should be noted, the above parameters in Category III are provided for illustrative purposes and should not be construed as limiting the present disclosure as provided above.

In some embodiments, empirical models can be used to evaluate a given audio slice in terms of the plurality of parameters in Category III.

In some embodiments, the feature vector may include a plurality of parameters in Category IV, which includes the complexity of the words contained in the audio slice (m1); the grammar used in the audio slice (m2); the grade score characterizing the audio slice in predetermined pedagogics (m3); the factors brought by cultural differences (m4); and the history profile of a user reading the audio slice (m5). As used herein, the complexity of the words contained in the audio slice (m1) represent that the audio slice may include very advanced vocabulary, such as, "electroencephalography." As used herein, the grammar used in the audio slice (m2) represents the difficulty of grammar used in the content contained in the audio slice. As used herein, the grade score characterizing the audio slice in predetermined pedagogics (m3) represents the difficulty grade assigned to the content contained in the audio slice by, for example, pedagogics developed by Cambridge University or other linguistic study institutions. It should be noted, the above parameters in Category IV are provided for illustrative purposes and should not be construed as limiting the present disclosure as provided above.

In some embodiments, empirical models can be used to evaluate a given audio slice in terms of the plurality of parameters in Category IV.

In some embodiments, each parameter in Categories I, II, III, and IV has been assigned a weigh factor. For example, parameter p1 in Category I may have a weight w1 of 100%, parameter p4 in Category I may have a weight w4 of 90%. For example, when "Hi" is contained in the audio slice, then parameter p1 is assigned as 1, while parameter p4 is assigned as 1.

For example, an audio stream includes the audio slices AS1-AS9 sequentially located in the audio stream that is represented by texts as below:

AS1: Hi
AS2: How are you
AS3: I am fine
AS4: Thanks
AS5: And you
AS6: No
AS7: I feel very bad
AS8: I got a cold
AS9: I was out the whole night.

Various empirical models have been utilized to determine the parameters in Category I-IV characterizing each of the audio slices AS1-AS9, as shown in below Table 1.

TABLE 1

| Cat. | Para. | Wgt. | AS1 | AS2 | AS3 | AS4 | AS5 | AS6 | AS7 | AS7 | AS9 |
|---|---|---|---|---|---|---|---|---|---|---|---|
| I | p1 | 100% | 1 | 3 | 4 | 2 | 2 | 1 | 6 | 8 | 7 |
|  | p2 | w2 | 90% | 1 | 3 | 4 | 3 | 2 | 1 | 6 | 7 | 9 |
|  | p3 | w3 | 4% | 1 | 3 | 3 | 1 | 2 | 1 | 5 | 4 | 6 |
|  | p4 | w4 | 3% | 2 | 5 | 6 | 4 | 5 | 2 | 11 | 9 | 14 |
|  | p5 | w5 | 2% | 1 | 3 | 3 | 1 | 2 | 1 | 4 | 4 | 6 |
|  | p6 | w6 | 1% | 2 | 9 | 7 | 6 | 6 | 2 | 12 | 9 | 19 |
| II | q1 | w7 | 40% | 1 | 1.1 | 1.2 | 1.2 | 1.3 | 1 | 1.2 | 1.3 | 1.2 |
|  | q2 | w8 | 30% | 1.2 | 1.2 | 1.2 | 1 | 1.4 | 1.2 | 1.2 | 1.4 | 1 |
|  | q3 | w9 | 10% | 1 | 1.1 | 1.2 | 1.2 | 1.3 | 1 | 1.2 | 1.3 | 1.2 |
|  | q4 | w10 | 10% | 1.2 | 1.2 | 1.2 | 1 | 1.4 | 1.2 | 1.2 | 1.4 | 1 |
|  | q5 | w11 | 10% | 1 | 1.4 | 1.2 | 1 | 1.5 | 1.2 | 1 | 1.4 | 1 |
| III | s1 | w12 | 80% | 1 | 1 | 1.1 | 1 | 1.2 | 1 | 1.3 | 1.3 | 1 |
|  | s2 | w13 | 20% | 1 | 1 | 1.1 | 1 | 1.2 | 1 | 1.3 | 1.3 | 1 |
|  | s3 | w14 | 50% | 1 | 1 | 1 | 1 | 1 | 1 | 1 | 1 | 1 |
|  | s4 | w15 | 50% | 1 | 1 | 1 | 1 | 1 | 1 | 1 | 1 | 1 |
| IV | m1 | w16 | 50% | 1 | 1 | 1.1 | 1.1 | 1.2 | 1 | 1 | 1.2 | 1.1 |
|  | m2 | w17 | 20% | 1 | 1 | 1 | 1 | 1 | 1 | 1.1 | 1 | 1 |
|  | m3 | w18 | 10% | 1 | 11 | 1.1 | 1 | 1 | 1 | 1 | 1 | 1 |
|  | m4 | w19 | 10% | 1 | 1 | 1 | 1 | 1 | 1 | 1.1 | 1 | 1 |
|  | m5 | w20 | 10% | 1 | 1 | 1 | 1 | 1 | 1 | 1.1 | 1 | 1 |

TABLE 2

| AS1 | AS2 | AS3 | AS4 | AS5 | AS6 | AS7 | AS8 | AS9 |
|---|---|---|---|---|---|---|---|---|
| 1 | 3 | 4 | 3 | 2 | 1 | 6 | 8 | 9 |

In some embodiments, various classification models may be used to determine the feature score of a given audio slice using the feature vector. For example, a random forest model or a recurrent neural network (RNN) model can be used to determine features scores based on the feature vector. A detailed description of the random forest model and the RNN model is provide below.

In some embodiments, method 400 may include applying a random forest model to the feature vector to generate an output of the random forest model; and determining the feature score based on the output of the random forest model.

In some embodiments, method 400 may include applying a recurrent neural network (RNN) model to the feature vector to generate an output of the RNN model; and determining the feature score based on the output of the RNN model.

After the feature score is determined for each audio slice in the audio stream, it is possible to further process the audio stream. In some embodiments, method 400 may further include determining (4010) that the feature score is greater than a predetermined threshold. For example, the predetermined threshold is 4. In some embodiments, it may indicate the progress level of the user is 4. For example, the feature scores of audio slices AS7-AS9 are greater than 4.

Then method 400 may further include updating (4012) the audio stream by replacing the audio slice with another audio slice having different content from the audio slice. For example, audio slice AS7 may be replaced by replacement audio slice RAS7, where audio slice AS7 includes content in English while replacement audio slice RAS7 includes the Chinese translation of the content in audio slice AS7.

In some embodiments, replacement audio slice RAS7 may come from another audio stream prepared in advance. For example, multimedia stream 2000 include audio stream 500 in English and audio stream 700 in Chinese.

In some embodiments, replacement audio slice RAS7 may come from a machine translation of the content of AS7.

In some embodiments, method 500 may further include determining (4008) a feature score for characterizing the audio slice based on the feature vector. For example, a predetermined model to use the weighted parameters may be used to determine the feature score (L). For example, a formula may be:

$$L=[(p1*w1)+(p2*w2+p3*w3+p4*w4+p5*w5+p6*w6)]/2*(q1*w7,q2*w8+q3*w9+q4*w10+q5*w11)*(s1*w12+s2*w13)*(s3*w14+s4*w15)*(m1*w16+m2*w17+m3*w18+m4*w19+m5*w20).$$

For example, the feature score L for AS1=[(1*100%)±(1*90%+1*4%+2*3%+1*2%+2*1%)]/2*(1*40%+1.2*30%+1*10%*1.2*10%+1*10%)*(1*80%+1*20%)*(1*50%+1*50%)*(1.1*50%+1*20%+1*10%+1*10%+1*10%)=1.1016.

It can be rounded as 1, which means AS1 has a very low feature score. It shows AS1 is very easy to learn.

As another example, another formula for determining the feature score L may be:

$$L=[(p1*w1)+(p2*w2+p3*w3+p4+w4)+(p5*w5+p6*w6)]/3*[(q1*w7+q2*w8+q3*w9+q4*w10+s1*w11)+(s3*w14+s4*w15)]/2+(s3*w14+s4*w15)+(m1*w16+m2*w17+m3*w18+m4*w19+m5*w20).$$

It should be noted that the above formula are provided for the purpose of illustration, and should not be construed as limiting the scope of the present disclosure.

For example, the feature scores for audio slices AS1-AS9 could be determined using the above exemplary formula, as shown in Table 2 below.

In some embodiments, replacement audio slice RAS7 may be processed to have the same duration as audio slice AS7.

In some embodiments, method 400 may further include storing (4014) the updated audio stream in an storage medium as a separate audio stream. Using the process illustrated in method 400, different audio streams corresponding to different progress levels of users can be generated and stored in the storage medium.

In some embodiments, method 400 may include receiving (4014) a control command for presenting the audio stream, wherein the control command comprises a grade value; determining (4016) that the grade value corresponds to the predetermined threshold; and presenting (4018) the updated audio stream. For example, a user may select a progress level 4, and the system may play the updated audio stream corresponding to feature score 4. As another example, a separate audio stream corresponding to a different feature score has been generated, the user may select an audio stream based on the progress level to play.

Another aspect of the present disclosure proposes a playback control method for automatically switching audio-video according to the smallest language unit, which includes the following steps:

Step S1: Two audio-video files $Y_1$ and $Y_2$, with the same content but in different audio language versions, are divided into multiple micro audio-video modules $Y_{1-x}$ and $Y_{2-x}$ according to the smallest language unit, and making the division accurate to the millisecond level;

Step S2: The two sets of micro audio-video modules $Y_{1-x}$ and $Y_{2-x}$ are synchronized one by one in the millisecond level according to the smallest language unit to establish a one-to-one correspondence; that is, the silent video file $V_0$, the first audio file $A_1$ and the second audio file $A_2$ are synchronous matching in the millisecond level according to the smallest unit;

Step S3: According to the background play control instruction, the micro audio-video modules $Y_{1-x}$ and $Y_{2-x}$ are automatically switched without loss of the audio-video playback continuity.

The present disclosure also proposes a playback control method for automatically switching audio-video according to the smallest language unit, which is characterized in that it includes the following steps:

Step S1: Two audio-video files $Y_1$ and $Y_2$, with the same content but different audio language versions, are marked on the time axis according to the smallest language unit, and the audio-video files $Y_1$ and $Y_2$ are divided into multiple micro audio-video modules $Y_{1-x}$ and $Y_{2-x}$, and make the division accurate to the millisecond level;

Step S2: The micro audio-video modules $Y_{1-x}$ and $Y_{2-x}$ are synchronously matched one by one in the millisecond level according to the smallest language unit to establish a one-to-one correspondence;

Step S3: According to the background play control instruction, the micro audio-video modules $Y_{1-x}$ and $Y_{2-x}$ are automatically switched without loss of the audio-video playback continuity.

Further, the audio-video include any form of audio-video, silent video or audio.

Further, the smallest language unit is a sentence, phrase, or word.

Further, the audio-video file $Y_1$ and the divided micro audio-video module $Y_{1-x}$ are the video filed in the user's mother voice; the audio-video file $Y^2$ and the divided micro audio-video module $Y_{2-x}$ are audio files in the user's non-native language.

Further, Step S3 is specifically as follows:

Step 1: Calibrating the difficulty value, difficulty level parameter, and difficulty code of the micro audio-video module $Y_{2-x}$ one by one;

Step 2: Obtaining user experience value, user ability level parameter or user code, etc.;

Step 3: Comparing the language difficulty value of the micro audio-video module $Y_{2-x}$ with the user experience value, and according to the comparison result, automatically switch and play the micro audio-video modules $Y_{1-x}$ and $Y_{2-x}$ according to the smallest language unit without loss of the audio-video playback continuity.

Further, when the difficulty value in the micro audio-video module $Y_{2-x}$ is lower than the user experience value, $Y_{2-x}$ is played in the module time slot.

Further, when the difficulty value of the module in the micro audio-video module $Y_{2-x}$ is equal to the user experience value, $Y_{2-x}$ is played in the module time slot and reserve time for the user interaction function, and automatically update the user experience value according to the evaluation result of the interaction.

Further, when the module difficulty value of the micro audio-video module $Y_{2-x}$ is higher than the user experience value, $Y_{1-x}$ is played in the module time slot.

The present disclosure also proposes a playback system that automatically switches audio-video according to the smallest language unit. The system applies the playback control method for switching audio-video according to the language smallest unit, and includes a back-end module, a control module and a service module that are signal-connected in sequence;

wherein, the back-end module includes an audio-video content database unit, an audio-video smallest unit database, and a data collection interaction unit;

the audio-video content database unit includes silent video files, audio-video files and audio files;

the data collection interaction unit splits in the smallest unit the silent video files, the audio-video files, and the audio files or annotated them according to the time axis, and matches the audio-video;

the service module includes an audio-video playback unit and an audio-video millisecond-level switching unit; the audio-video playback unit is configured to obtain and play the silent video files, the audio-video files, and the audio files in the data collection interaction unit;

the audio-video millisecond-level switching unit is configured to implement millisecond-level switching between different audio files;

the control module includes a user experience value evaluation unit and a short sentence difficulty judgment unit, a file matching unit and a personalized combination push unit;

the short sentence difficulty judgment unit is configured to receive the data signal of the audio-video smallest unit database and generates the difficulty value label for the short sentence; the user experience value evaluation unit is configured to collect the user's preset experience value;

the file matching unit is configured to obtain and compare the information of the user experience value evaluation unit and the short sentence difficulty judgment unit, and then output the comparison result to the personalized combination push unit;

the personalized spliced push unit is configured to output the playback sequence information for different audio files to the service module.

Further, the user experience value evaluation unit includes an adjustment subunit; the adjustment subunit is configured to receive input information from the user and adjusts the preset experience value.

Further, the adjustment subunit dynamically updates the user experience value according to the evaluation result after user interaction.

Further, the service module further includes a follow-up evaluation unit; when the user experience value is equal to the difficulty value of the smallest unit, the follow-up evaluation unit is configured to record the user's follow-up audio, compare the follow-up audio with the original audio, and output the comparison result to the front-end display module.

Further, the back-end module further includes a user database unit; the user database unit is configured to record the user's use track.

The technical solution of the present disclosure will be further described below with reference to Embodiments 1 to 4.

Embodiment 1

Figure 6:
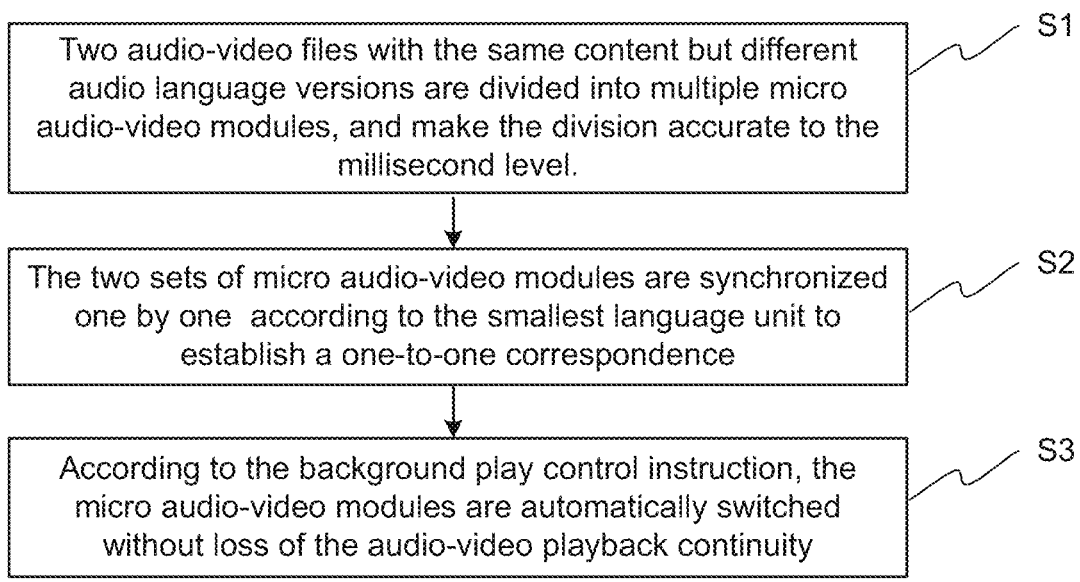
FIG. 6 is a flowchart illustrating a playback control method for automatically switching audio-video according to the smallest language unit according to some embodiment of the present disclosure.

As shown in FIG. 6, this embodiment proposes a playback control method for automatically switching audio-video according to the smallest language unit, including Steps S1 to S3, which are specifically as follows:

Step S1: Two audio-video files $Y_1$ and $Y_2$ with the same content but different audio language versions are divided into multiple micro audio-video modules $Y_{1-x}$ and $Y_{2-x}$ according to the smallest language unit, and make the division accurate to the millisecond level. In this embodiment, the micro audio-video module $Y_{1-x}$ includes the silent video file $V_0$ and the first audio file $A_1$; the micro audio-video module $Y_{2-x}$ includes the second audio file $A_2$;

Step S2: The two sets of micro audio-video modules $Y_{1-x}$ and $Y_{2-x}$ are synchronized one by one at the millisecond level according to the smallest language unit to establish a one-to-one correspondence;

Step S3: According to the background play control instruction, the micro audio-video modules $Y_{1-x}$ and $Y_{2-x}$ are automatically switched without loss of the audio-video playback continuity.

Further, the audio-video file $Y_1$ and the divided micro audio-video module $Y_{1-x}$ are the video files in the user's mother voice; the audio-video file $Y_2$ and the divided micro audio-video module $Y_{2-x}$ are the audio files in the user's non-native language.

Further, step S3 is specifically as follows:

Step 1: Perform difficulty value calibration on the micro audio-video module $Y_{2-x}$ one by one; that is, perform difficulty value calibration on the smallest unit in the second audio file $A_2$; wherein the smallest unit can be a sentence, a word, or a phrase.

Step 2: Obtain a user experience value;

Step 3: Compare the language difficulty value of the micro audio-video module $Y_{2-x}$ with the user experience value, that is, compare the smallest unit difficulty value in the second audio file $A_2$ with the user preset experience value. According to the comparison result, micro audio-video modules $Y_{1-x}$ and $Y_{2-x}$ are automatically switched and played according to the smallest language unit without loss of continuity of audio-video playback.

Specifically, when the difficulty value in the micro audio-video module $Y_{2-x}$ is lower than the user experience value, $Y_{2-x}$ is played in this module period; when the module difficulty value in the micro audio-video module $Y_{2-x}$ is equal to the user experience value, $Y_{2-x}$ is played in this module period, and time for user interaction functions is reserved, and the user experience value is automatically accumulated and updated according to the evaluation result of the interaction; when the module difficulty value of the micro audio-video module $Y_{2-x}$ is higher than the user experience value, $Y_{1-x}$ is played in this module period. Specifically, when the difficulty value of the smallest language unit in the second audio file $A_2$ is compared with the user experience value, according to the comparison result, the micro audio-video modules $Y_{1-x}$ and $Y_{2-x}$ are automatically switched according to the smallest language unit, and the silent video file $V_0$ is synchronized with the first audio file $A_1$ or the second audio file $A_2$. Through steps S1 to S3, it is realized that when the micro audio-video modules $Y_{1-x}$ and $Y_{2-x}$ are switched in millisecond-level according to the smallest language unit, and the video file is played continuously, and the playback progress of the video file is synchronized with the first audio file or the second audio. When the user experience value is equal to the difficulty value of the smallest language unit, the smallest units in the first audio file $A_1$ and the second audio file $A_2$ are played in sequence. Further, after the first audio file $A_1$ is played, time is reserved for user interactive function. After the follow-up reading, based on the evaluation of the interaction of the second audio file $A_2$, the user preset experience value is automatically accumulated and updated. During the follow-up interaction, the system automatically records the follow-up audio and automatically updates the preset experience value. When the user experience value is not equal to the difficulty value of the smallest language unit, if the preset experience value is greater than the difficulty value of the smallest unit, the first audio file $A_1$ is automatically played; otherwise, the second audio file $A_2$ is automatically played.

Figure 7:
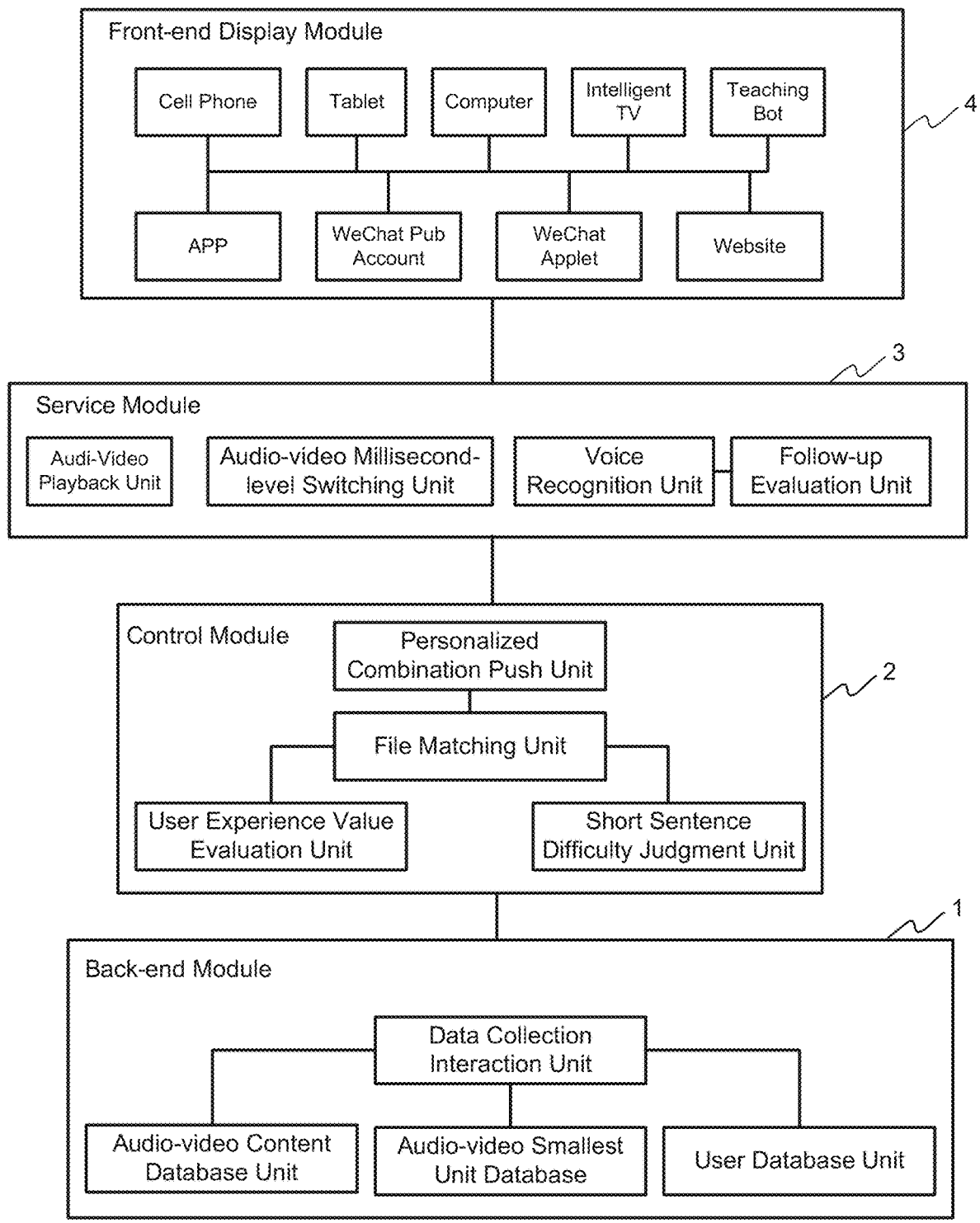
FIG. 7 is a diagram illustrating a playback system that automatically switches audio-video according to the smallest language unit according to some embodiments of the present disclosure.

As shown in FIG. 7, this embodiment also proposes a playback system that automatically switches audio-video according to the smallest language unit, and applies the above-mentioned playback control method for switching audio-video according to the smallest language unit for a foreign language learning system. The system include, sequentially signal-connected back-end module 1, control module 2, service module 3 and front-end display module 4. The role of back-end module 1 is to accurately switch audio files in different language versions in millisecond-level. The role of service module 3 is to receive, through control module 2, different instructions from the front-end display module 4 to complete the millisecond-level switching of different language versions in order to ensure the continuity of video files. Specifically, the back-end module 1 includes an audio-video content database unit, an audio-video smallest unit database, and a data collection interaction unit. The audio-video content database unit includes a silent video file, an audio-video file, and an audio file. In this embodiment, it includes the silent video file, the first audio file, and the second audio file. The language versions of the first audio file and the second audio file are Chinese and English respectively. In embodiments other than this embodiment, the second audio file may be a language version other than English. The audio-video smallest unit database includes multi-dimensional refinement elements based on the second audio file (English version). The function of the audio-video smallest unit database is to refine the second audio file (English version) in multiple dimensions, among which the dimensions on which the refinement is based include the sentence length, the syllable length, the speech speed, the clarity, and the difficulty. The data collection interaction unit, based on the smallest unit as the unit, cut or mark the silent video file, the first audio file, and the second audio file, to form the multiple silent video files $V_0$, the first audio file $A_1$ and the second audio file $A_2$, and synchronize the silent video file $V_0$ and the first audio file $A_1$, the silent video file $V_0$ and the second audio file A 2; that is, referring to the smallest unit data file in the audio-video smallest unit database, divide the first database $A_1$ (Chinese version audio file), the second database $A_2$ (English version audio file) based on the smallest unit, and make sure the high-frequency and accurate switching in the millisecond level between the first audio file $A_1$ and the second audio file $A_2$, and make sure that silent video file $V_0$ keeps continuous and does not freeze, which means that different versions of audio files and video files are synchronized. The data collection interaction unit can switch between different language versions of the same video at any point in time without breaking the continuity of cross-version video. The service module 3 includes an audio-video playback unit and an audio-video millisecond-level switching unit. The audio-video playback unit is configured to obtain and play the silent video file $V_0$, the first audio file $A_1$, and the second audio file A 2 in the data collection interaction unit. When the audio-video millisecond-level switching unit performs the switching between the first audio file $A_1$ and the second audio file $A_2$, the first audio file $A_1$ or the second audio file $A_2$ is synchronized with the silent video file $V_0$.

In this embodiment, the back-end module 1 includes a user database unit. The user database unit is configured to record the user's usage track, such as total views, interaction time, usage times, preferences, age, whether they have English training background and record the updated experience value. It is convenient for the control module 2 to push the silent video with a high degree of fit with the user. In addition, the user database unit is also configured to store the user's practice content for the user to review and consolidate.

In this embodiment, the control module 2 includes a user experience value evaluation unit. The user experience value evaluation unit receives the input signal from the front-end display module 4, and outputs the user's preset experience value to the front-end display module 4. The user experience value evaluation unit stores the preset experience value. The control module 2 pushes the playing sequence of the Chinese and English versions according to the preset experience value and the user database unit.

In this embodiment, the control module 2 includes a short sentence difficulty judging unit, a file matching unit, and a personalized combination push unit. The short sentence difficulty judging unit receives the data signal from the data collection interaction unit and generates the difficulty label for the English short sentence. Dimensional elements such as sentence length, syllable length, speech speed, clarity, and difficulty are all given difficulty value labels. The file matching unit is configured to obtain and compare the information from the user experience value evaluation unit and the English short sentence difficulty judgment unit. Then the comparison result is output to the personalized combination push unit. The personalized combination push unit is configured to output the audio playback sequence information of different language versions to the service module 3, so as to realize the gradual bilingual input when the user watches the silent video. In this process, the English ability of the learning individual is completely taken as the leading factor, and English audio content acceptable to the learning individual is presented with the English silent video. Among them, according to the comparison result, the personalized combination push unit has the following possible playback sequence: if the difficulty value of the smallest unit content in the silent video is higher than the user experience value, the playback sequence information in this sentence is playing in Chinese to ensure that the user understand the information, so as to achieve the continuity of the story; if the difficulty value of the smallest unit content in the silent video is equal to the user's preset experience value, the playback order information of this sentence is: play Chinese first, then English, and then pop up follow-up read interface; if the difficulty value of the smallest unit content in the silent video is lower than the user's preset experience value, the playback order information of this sentence is playing in English.

In this embodiment, the service module 3 further includes a voice recognition unit and a reading evaluation unit. The voice recognition unit uploads the follow-up audio to the reading evaluation unit. When the preset experience value is equal to the smallest unit difficulty value, the follow-up evaluation unit records the user's follow-up audio, compares the follow-up audio with the source audio, and outputs the comparison result to the front-end display module 4. In the process of silent video playback, based on the user's actual foreign language cognition level, the interaction between the user and the system is realized in the form of follow-up evaluation, creating a scene for the user's oral skills exercise.

In this embodiment, the user experience value evaluation unit includes an adjustment subunit. The adjustment subunit receives input information from the user and adjusts the preset experience value. To prevent errors that may be caused by subjective information, users can manually adjust their own experience values in the user center interface of front-end display module 4. In addition, after the user starts the follow-up interaction with the platform, each follow-up will produce a score. This score can also take as input parameters from many aspects such as fluency, accuracy, and clarity. The adjustment subunit is configured to, according to the follow-up audio, dynamically update the initial experience value, which is convenient for users to use repeatedly.

In this embodiment, the follow-up evaluation unit includes a limiting subunit. The limiting subunit records the number of openings, and when the number of openings exceeds the set value of the limiting subunit, the limiting subunit is closed. The entire silent video will be played based on the scene of the movie, and the auxiliary part will used for follow-up reading. The number of follow-up readings can be manually adjusted by the limiting subunit, so that it can ensure that there is a part of speaking exercise in the middle of each silent video, and also ensure that the number of interruptions for each part does not exceed a certain number to prevent children from losing interest in learning. In addition, the proportional relationship between viewing and reading can be dynamically adjusted by adjusting the difficulty value to maintain a balance between fluency and practice intensity.

The working process of the present disclosure is specifically as follows:

In this embodiment, the administrator account is pre-configured and relevant authorizations are assigned. Users can perform select operations on databases in production environments. Users can perform select, update, insert, and delete operations on databases in pre-release environments, which are controlled by the administrator account authority in the database. After the system is deployed, the administrator will enter the project leader, database information, and sensitive rules into the platform according to the project dimensions, and complete the initialization work, including: user experience evaluation system rules, audio-video files, time control documents, and English skits difficulty evaluation system rules. The front-end display module 4 can be displayed on various electronic terminals in the form of WeChat official account, WeChat applet, APP (Android and IOS system) and Website. When the user visits for the first time, the interface will briefly explain the concept and implementation logic of this platform. Users can directly participate in the experience of this service as a guest through WeChat ID without a compulsory registration. The specific experience process is as follows:

It takes the English enlightenment education system for children as an example. According to the interface prompts of the front-end display module 4, a user selects the level of children's exposure to English and clicks "Submit". The control module 2 calculates the user's current English default experience value in the system according to the result of the click. The system displays the difficulty level suitable for the user to start on the front-end display module 4 according to the calculation result of the back-end. The user clicks "Enter Bilingual World" on the front-end display module 4 to enter the video selection interface. Based on the information input by the user, the system intelligently recommends a cartoon suitable for the user to learn and the beginning point of the series. The user clicks on one of the cartoons and the cartoon starts to play and complete the watching and follow-up reading of the entire cartoon according to the following rules: If the difficulty value of a single sentence in the cartoon is higher than the user's preset experience value, this sentence is played in Chinese to ensure the user's understanding of the information and realize the continuity of the story; if the difficulty value of a single sentence in the cartoon is equal to the user's preset experience value, the sentence will be played in Chinese first, and then in English, and then the front-end display module 4 will pop up a follow-up interface. The user's follow-up reading is recorded, and the voice recognition unit uploads the follow-up audio to the follow-up evaluation unit in the system back-end, and the follow-up evaluation unit compares the follow-up audio with the source audio, and presents the comparison result to the front-end interface. If the user does not pass the threshold, then the front-end interface prompts to continue the read until it passes. If the user passes the threshold, then he/she can enter the next sentence. This can ensure that there are some speaking exercises in the middle of each cartoon. In addition, the back-end module 1 also has a control button to turn off the follow-up evaluation module to provide an uninterrupted continuous bilingual input environment. If the difficulty value of a single sentence in the cartoon is lower than the user's preset experience value, then the cartoon is played in English directly.

Embodiment 2

This embodiment also proposes a playback control method for automatically switching audio-video according to the smallest language unit. The difference from Embodiment 1 is that this method uses time axis labeling to obtain multiple silent video files $V_0$, first audio files $A_1$, and the second audio file $A_2$. The method specifically includes the following steps:

Step S1: Two audio-video files $Y_1$ and $Y_2$ with the same content but different audio language versions are marked on the time axis according to the smallest language unit. The audio-video files $Y_1$ and $Y_2$ are divided into a plurality of micro audio-video modules $Y_{1-x}$ and $Y_{2-x}$, and the division is accurate to the millisecond level. In this embodiment, the micro audio-video module $Y_{1-x}$ includes a silent video file $V_0$ and a first audio file $A_1$, the micro audio-video module $Y_{2-x}$ includes the second audio file $A_2$.

Step S2: The micro audio-video modules $Y_{1-x}$ and $Y_{2-x}$ are synchronously matched one by one in the millisecond level according to the smallest language unit to establish a one-to-one correspondence.

Step S3: According to the back-end play control instructions, the micro audio-video modules $Y_{1-x}$ and $Y_{2-x}$ are automatically switched without loss of the audio-video playback continuity.

Embodiment 3

This embodiment also proposes a playback control method for automatically switching audio-video according to the smallest language unit. The difference from Embodiment 1 is that a synchronization matching in the millisecond level is performed on the silent video file $V_0$ and the first audio file $A_1$ based on the smallest unit to form the audio-video file $V_1$. Then the audio-video file $V_1$ and the second audio file $A_2$ are synchronized in the millisecond level according to the smallest unit. The method specifically includes Steps 1 to 5:

Step 1: marking the silent video file, the first audio file, and the second audio file based on the smallest unit on the time axis respectively to obtain multiple silent video files $V_0$, the first audio file $A_1$, and the second audio file $A_2$, and make sure the marking accurate to the millisecond level, wherein the language versions of the first audio file $A_1$ and the second audio file $A_2$ are different.

Step 2: performing synchronously matching in the millisecond level between the silent video file $V_0$ and the first audio file $A_1$ according to the smallest unit to form the audio-video file $V_1$; performing synchronously matching in the millisecond level between the audio-video file $V_1$ and the second audio file $A_2$ according to the smallest unit.

Step 3: performing difficulty value calibration on the smallest unit in the second audio file $A_2$.

Step 4: obtaining user preset experience values.

Step 5: comparing the difficulty value of the smallest unit in the second audio file $A_2$ with the user preset experience value, and according to the comparison result, the audio-video file $V_1$ automatically switches the first audio file and the second audio file according to the smallest unit.

Embodiment 4

This embodiment also proposes a playback control method for automatically switching audio-video according to the smallest language unit. The difference from Embodiment 1 is that synchronization matching in the millisecond level is performed first between the silent video file $V_0$ and the first audio file $A_1$ according to the smallest unit to form an audio-video file $V_1$. Then synchronization matching in the millisecond level is performed between the silent video file $V_0$ and the second audio file $A_2$ according to the smallest unit to form an audio-video file $V_2$. The method specifically includes Steps 1 to 5:

Step 1: marking the silent video file, the first audio file, and the second audio file according to the smallest unit to obtain multiple silent video files $V_0$, the first audio file $A_1$, and the second audio file $A_2$, and making sure the marking accurate to the millisecond level, wherein the language versions of the first audio file $A_1$ and the second audio file $A_2$ are different.

Step 2: performing the synchronization matching in the millisecond level between the silent video file $V_0$ and the first audio file $A_1$ according to the smallest unit to form the audio-video file $V_1$, and performing the synchronization matching in the millisecond level between the silent video file $V_0$ and the second audio file $A_2$ to form an audio-video file $V_2$.

Step 3: performing difficulty value calibration on the smallest unit in the second audio file $A_2$.

Step 4: obtaining user preset experience values.

Step 5: comparing the difficulty value of the smallest unit in the second audio file $A_2$ with the user preset experience value, and according to the comparison result, the audio-video file $V_1$ and the audio-video file $V_2$ are automatically switched according to the smallest unit.

In summary, in the playback control method and playback system for switching audio-video according to the smallest language unit provided by the embodiments of the present disclosure, technical means are used to finely cut the cartoon down to the lowest level of syllables and sentences of the language. Freedom of recombination can remain to the greatest possible extent. When recombination, the individual experience and interactive progress are introduced, and the play sequence combination is dynamically adjusted automatically. The play sequence combination that best suits their learning within each individual's foreign language cognition is pushed to the user, so as to achieve a high-intensity information input on the basis of ensuring continuity and interest, thereby creating a natural bilingual environment.

Another aspect of the present disclosure proposes a method for splicing audio-video files in multiple languages according to predetermined levels.

In order to make the explanation clear, the method is illustrated first by way of an example of splicing a bilingual (one non-native language+one native language) audio-video video.

In order to solve various problems in the existing bilingual audio-video learning scenarios, some embodiments of the present disclosure first classifies non-native language materials. Then, according to the classification, the native language materials and non-native language materials are finely stitched together, so as to provide users with a playback solution for the bilingual audio-video suitable for themselves. By presenting the non-native language material and the native language material in the bilingual form according to the appropriate level when playing the bilingual audio-video work, and selecting a higher level of bilingual composite video as the user's ability improves, the user can obtain the following benefits:

For Adult Users:
  Better appreciation of foreign language film and television works;
  Maintain an environment with suitable English ability for a long time, and improve themselves.
For Young Users:
  More targeted input of foreign language materials to avoid unintelligible situations and increase the interest in learning;
  Continuously suitable progressive bilingual environment.

Figure 8:
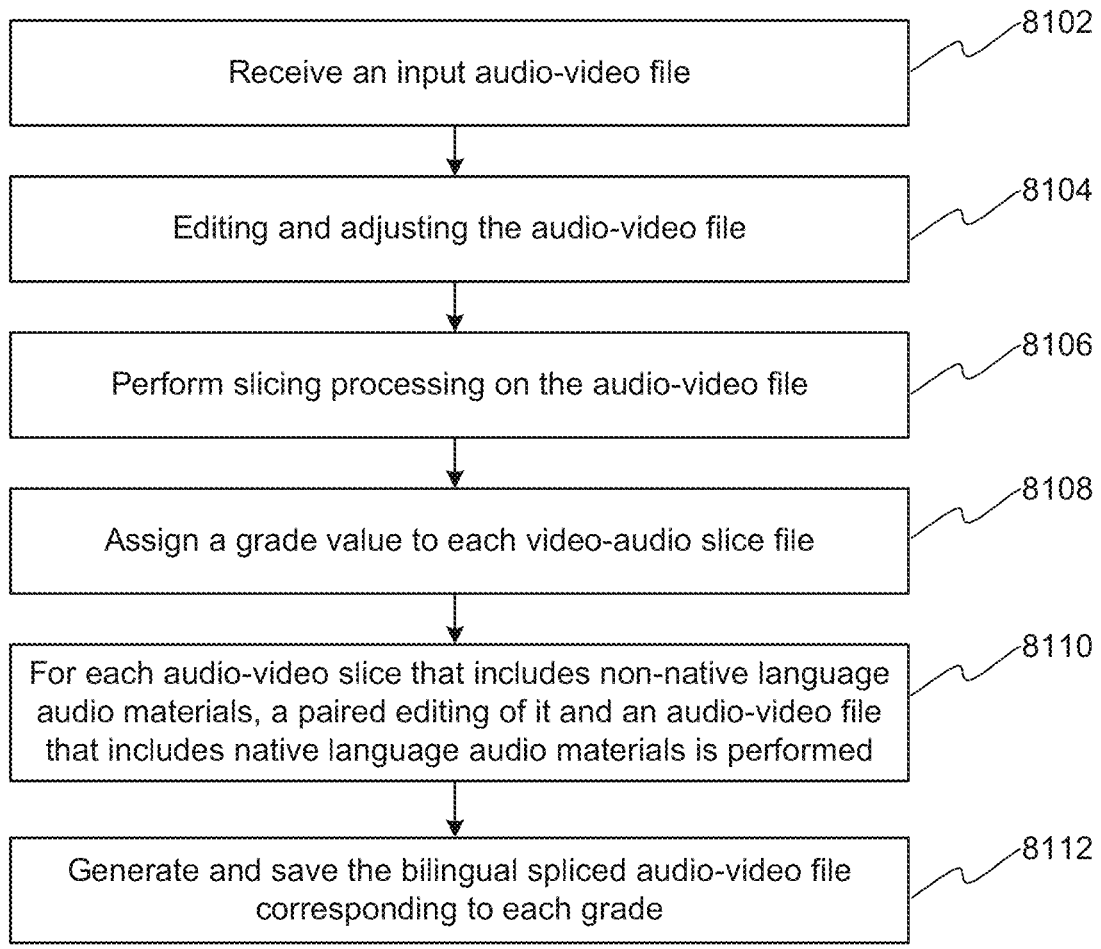
FIG. 8 is a flowchart illustrating a method for splicing audio-video files in multiple languages according to an embodiment of the present disclosure.

First, FIG. 8 shows an example flowchart of a method for splicing audio-video files in multiple languages according to an embodiment of the present disclosure. In this embodiment, the system can directly receive audio-video files including native-speaking audio materials and non-native-speaking audio materials, and automatically merging them according to the classification.

As shown in the figure, in step 8102, the system receives an input audio-video file. The audio-video file includes at least a non-native language audio material, or may further include a native language audio material for the same content. After being processed, the audio-video files will be used as teaching materials for users to learn foreign languages. The audio-video files can be in the following forms:
  1) Silent video, generally used as a teaching background;
  2) Audio-video including language audio material;
  3) Audio files without video images and only audio materials.

According to different application scenarios, the received audio-video files may include one or more files in the above-mentioned forms. A detailed description will be given below in with reference to specific examples.

Example 1: The received audio-video file is an audio-video file in two language versions of the same content, for example, an audio-video including native language audio and an audio-video including non-native language audio of the same content. In this scenario, the system will directly combine the two audio-videos into a bilingual mixed audio-video according to the subsequent classification. In some embodiments, an audio-video can have two audio tracks in different languages at the same time (for example, one is a native language audio track, and the other is a non-native language audio track). In this case, only the two audio tracks of the audio-video are required. A dual-voice track can be constructed by combining two audio tracks into a dual-voice track according to the classification to construct an audio-video including bilingual mixing materials.

Example 2: The received audio-video file is a silent video and two audio files containing different language materials for the same content, such as a silent video, an audio file including native language audio materials, and an audio file including non-native language audio materials. For this kind of scene, a bilingual mixed audio-video can be spliced by using the silent video as the background during playback, and combining the two audio files into a bilingual audio according to the classification.

Example 3: The received audio-video file is an audio file containing one language material (for example, non-native language audio) and another language material (for example, native language audio). Then, the system can replace the corresponding non-native language audio slice in the audio-video with the native language audio slice in the audio file according to the classification to combine a bilingual mixed audio-video file.

The audio-video files including native language audio materials may be input from the system, or may be retrieved from external resources, such as the Internet, based on the already input audio-video files including non-native language audio content. Or it can be supplemented by technical means, for example, based on text, and using speech recognition technology to generate the corresponding audio content.

Regardless of the above-mentioned examples, after receiving the required audio-video files, the audio-video files including non-native language audio materials can be edited and adjusted for the purpose of being suitable for language learning, that is, step 8104, the editing and adjustments including but are not limited to:

Editing and marking the beginning and end of the film so that it has the optional function of skipping the beginning and end of the film in actual playback;

Noise reduction, that is, to weaken the meaningless background sound in the audio content according to the learning scene;

Filtering and checking sentence by sentence, and marking sentences not meaningful for learning, and the following processing being performed according to the nature of the sentence of not meaningful for learning:
1. No processing. That is to say, it is regarded as a normal sentence to apply the subsequent grading rules.
2. If it is not easy to understand in a non-native language, such as unclear pronunciation, it can be converted and fixed as corresponding content in native language.
3. Although it has no learning significance, it still has certain edifying significance, such as short songs, opening songs, etc., which can be fixed as non-native content in the subsequent combining process.

The search for sentences with no learning significance can be manually analyzed, for example, based on the clarity of pronunciation (unclear sentences are played in the native language, or intelligible sentences are fixed in the native language), sentence difficulty (sentences that are too long or too difficult are fixed in the native language), or special sentences (such as the soundtrack, which makes it weird to be sung with dubbing after translation into the native language, hence being fixed in non-native language).

The above operations are merely examples, and in fact various other adjustment operations can also be applied to the solutions of the present disclosure.

It should be understood that the data preprocessing (or can also be called data cleaning operation) for editing and adjusting the audio-video files is not necessary. Even without the preprocessing step, as long as the quality of the audio-video files is high, the subsequent operations can be successfully performed. If the audio material in the audio-video file is of poor quality, performing the data preprocessing operation can improve the execution efficiency and accuracy of subsequent steps.

After the above-mentioned preprocessing of the audio-video file is completed, the method proceeds to step 8106.

In step 8106, the system performs slicing (sliceation) processing on the audio-video file including the non-native language audio material. For example, the entire audio-video file may be sliced in units of sentences, and the slicing process may include the following steps:
1. Using speech recognition technology to mark out the start and end timestamps of each sentence in the audio-video file.
2. Analyzing the language structure of the non-native language audio, and merging or re-slicing sentences to determine a single audio-video slice that can be expressed as a sentence independently.
3. Removing the damage impact to sentences caused by language differences, such as inversion and adjective clauses in English.
4. Separating the time gaps between adjacent sentences.
5. For gaps within a certain period of time, cutting in the center, that is, for gaps that exceed a certain period of time, marking the two ends with timestamps then cutting, and labeling them as invalid sentences. The invalid sentences may not be used in the bilingual combination processing. It can avoid a too long invalid waiting time in the video slice.
6. Encoding the audio-video slices and store them in a storage unit.

It should be understood that many audio-video editing tools, software or technologies in the field provide the function of dividing a long speech into several short speech slices to realize speech recognition, such as Fast Editing, Adobe Premiere Pro, iMovie, and Corel Video Studio and so on. For example, Adobe Premiere Pro is a non-linear video editing software developed by Adobe. It provides users with a series of video capturing, editing, toning, color beautification or adding various filters, special effects, subtitles, etc. After more than ten years of continuous development, it has become one of the most popular video editing software, and it provides the slice function. These slicing techniques are also applicable to the slicing of the audio-video file described in step 8106. Therefore, technicians can select appropriate audio-video editing tools, software, or technology to perform the above steps in accordance with their own needs.

It should also be understood that, in addition to slicing by sentence as described above, technicians can also select, for example, a word or a phrase as the smallest slicing unit according to the actual semantics and pronunciation rules of the target non-native language. This also belongs to the protection scope of this disclosure.

In some embodiments, when in the application scenario of words and phrases, the system, according to certain algorithm (combining word difficulty, necessity, not affecting the playback sequence, and sentence fluency), assigns a grade value to respective words and phrases in the entire audio-video file. If the audio-video file is played at this grade, the words and phrases in the audio-video file whose grade is less than or equal to this grade that is suitable for presentation are presented in the non-native language. For example, the audio-video file "I want an apple" is played at grade 2. The video file will be replaced with "I want (in Chinese) an Apple" because only the word "want" has a grade value greater than grade 2. This kind of playback does not meet the fluency requirements of sentence learning. It will overly destroy the fluency and logic of language expression. Therefore, it can be played as: "I want an Apple (in Chinese)" through optimization. This is a simple example of an application scenario for word and phrase slicing.

For the convenience of description, in the following embodiments, English is used as an example of the non-native language, and Chinese is used as an example of the native language. According to the semantic and pronunciation rules of the language, the audio-video file is selected to be sliced by sentence. The aforementioned slicing process belongs to the physical level of cutting, which divides the entire audio-video file into multiple audio-video slices. In fact, virtual cutting can also be used to realize the slicing, which will be described in detail in the following description.

After the audio-video editing tool, software or technology has been used to complete the slicing of the audio-video file, the method proceeds to step 8108.

In step 8108, the system assigns a grade value to each video-audio slice file based on a linguistic grading model constructed by each of the audio-video slices including non-native language audio materials that have been cut to achieve the classification of the audio-video slices.

The classification step may include the following steps:
1. Building a grading model to finely grade the audio-video slices by forming a comprehensive evaluation dimension from linguistics, phonetics and other aspects of an audio-video slice. The grading model will be adaptively updated according to the added/removed parameters used for grading as the project progresses. Therefore, the scalability of the parameters has been considered when the model is built. Later, the parameters in the model and weights thereof can be expanded and/or modified in the back-end. The parameters and algorithms involved in the construction of the grading model are described in detail in the following examples.
2. Setting information collection rules. The rules set up the counting model for extracting existing or newly created corresponding parameters from the grading model, such as slice duration counter, slice phoneme counter, slice syllable counter, slice phone counter, in-slice sentence and word counter, in-slice character counter, and other counters, etc. These counters respectively record the data of relevant parameters in the sentence to be graded. For the specific content of these counters, please refer to the description in the following specific examples. In addition to the above-mentioned parameter statistics, some parameters need to be obtained based on experience, such as oral muscles vocal habits, such as the lisping consonant in English, the uvula consonant in German, and so on. Technicians can manually select and adjust these special parameters based on the pronunciation experience of the specific language and the actual feedback during the operation.
3. The system assigns values and weights to the parameters involved in the information collection rules according to the audio-video features and text features in the audio-video slices to be graded to construct the audio-video slice-grade coefficient reference table.
4. The grading model calculates the final value of the audio-video slice according to the audio-video slice-grade coefficient reference table, and determines the grade of the audio-video slice based on the comparison between the final value and the grading threshold.

After grading all the audio-video slices, the method proceeds to step 8110.

At step 8110, for each audio-video slice that includes non-native language audio materials, a paired editing of it and an audio-video file that includes native language audio materials is performed. Since the audio-video file containing the corresponding native language material has been received when the audio-video file is received in step 102, the following operations can be performed for each audio-video slice containing non-native-language audio material:
1. Retrieving audio-video slices (or its start and end timestamps) that include non-native language audio materials;
2. Pairing and editing the non-native language audio-video slices and the audio-video files that include native language audio materials. The pairing includes matching images, timestamps, or voice associated with the audio-video slices that include non-native language audio materials and images, timestamps, or voice associated with the audio-video files that include native language audio materials. Then a audio-video slice including the native language audio materials corresponding to the non-native language audio materials in the audio-video slice is re-cut from the audio-video files including the native language audio materials, and they are stored in the memory in association with each other.

After completing the paired editing of each audio-video slice including the non-native language audio material and the audio-video slice including the native language audio material, the method proceeds to step 8112.

In step 8112, the system uses the grade of each of the audio-video slices including non-native language audio materials as the grading basis, and generates and saves the bilingual spliced audio-video file corresponding to each grade. The step may include the following specific steps:
1. Arranging a list of grades associated with the audio-video slices of the film and television work in the order, for example, from low to high.
2. For each grade in the grading list, generating a bilingual composite audio-video file of this grade, the duration of which is the same as the original input audio-video file including non-native language audio materials, but the presentation rule is: in the bilingual composite audio-video file, for those audio-video slices having a grade that is equal to or less than a given grade, the audio-video slice that include non-native language audio materials will be presented, and for those audio-video slices having a grade that is larger than this given grade, the audio-video slices that include native language audio materials will be presented.

After the bilingual spliced audio-video files corresponding to the grades are generated, the generated bilingual spliced audio-video files for each grade are stored in a separate storage unit for user's selection or back-end push. So far, the method for combining audio-video files in multiple languages according to grades ends.

In the previous example, it is introduced that the input audio-video files include one or more audio-video files including native language audio material and non-native language audio materials for the same content, and they are automatically merged according to the grades. However, in some scenarios, the system may only receive an audio-video file that includes non-native language audio materials, but cannot directly obtain an audio-video file that includes the corresponding native language audio materials. In this case, the system can first try to use the Internet to find the corresponding audio-video files that include native language audio materials. If the audio-video file including the native language audio materials can be found through the network, the system can continue to execute the combining method shown in FIG. 8. However, in many cases, the system may not be able to find such audio-video files from other channels. In this case, it is necessary to use manual post-dubbing to provide the audio-video files including the native language audio materials for the same content. The example flowchart of the combining method in this case is described in FIG. 9 below.

Figure 9:
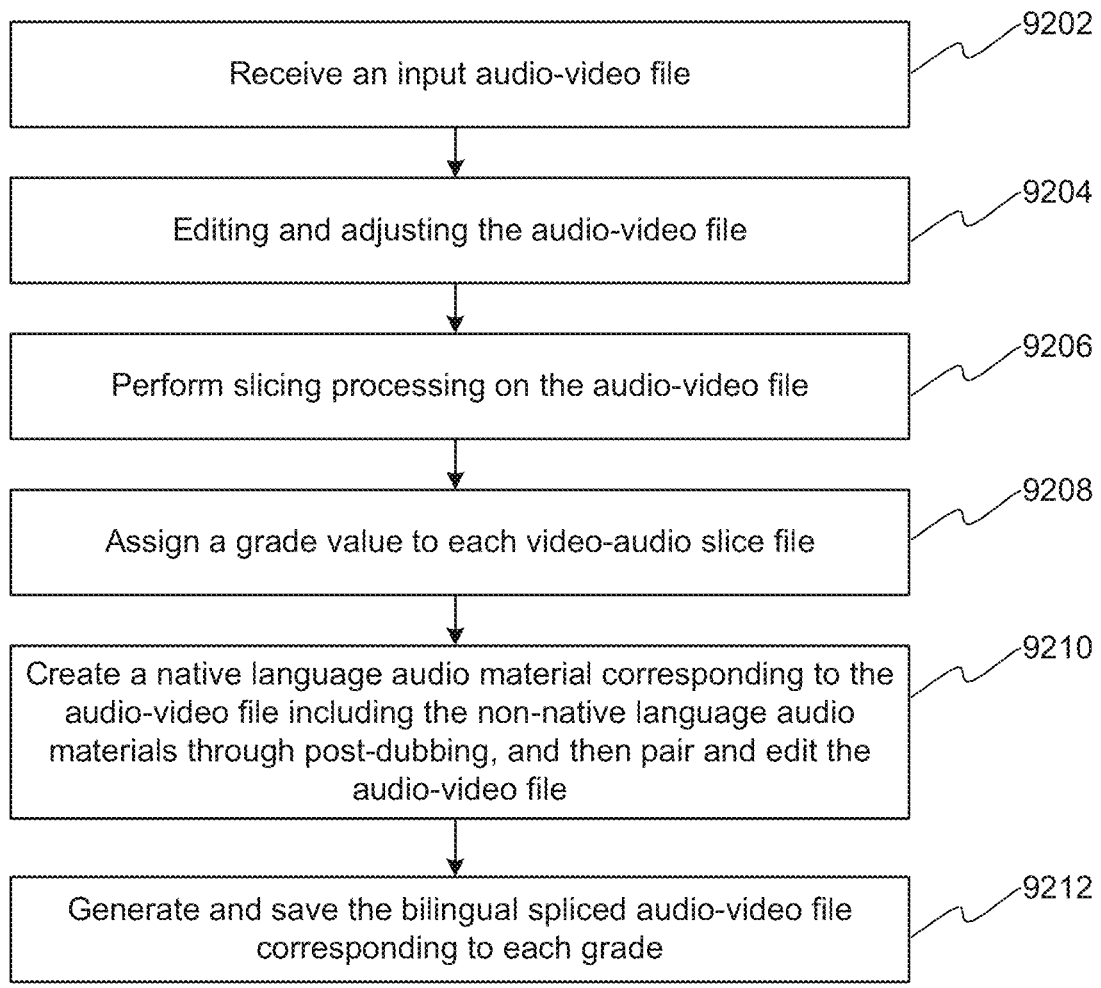
FIG. 9 is a flowchart of another method for combining audio-video files in multiple languages according to another embodiment of the present disclosure.

As shown in FIG. 9, there is shown an exemplary flowchart of another method for combining audio-video files in multiple languages according to another embodiment of the present disclosure.

First, unlike step 8102, in step 9202, the system only receives audio-video files that include non-native language audio materials. As mentioned above, the audio-video file may be an audio file including non-native language audio materials, an audio file with no video image and only non-native language audio materials, or a combination of a silent video and non-native language audio file, and so on. Native language audio materials are not included in these audio-video files.

Subsequently, in step 9204, The audio-video materials including the non-native language audio materials are edited and adjusted. The editing and adjustment steps are similar to step 8104, and will not be repeated here.

In step 9206, the system performs slicing (split) processing on the audio-video file including non-native language audio materials, for example, by sentence, to generate a plurality of audio-video slices including non-native language audio materials. The slicing process is similar to the process in step 8106, and will not be repeated here.

In step 208, the system assigns a grade value to each audio-video slice file according to a grading model constructed from the linguistic parameters of each audio-video slice that has been cut to achieve the grading of the audio-video slice. The specific grading process is similar to the process in step 8108, and will not be repeated here.

Next, at step 9210, since in the scenario of this embodiment, the system only receives audio-video files including non-native language audio materials in step 9202, and lacks the corresponding native language audio materials. Therefore, in this step, it is necessary to create a native language audio material corresponding to the audio-video file including the non-native language audio materials through post-dubbing, and then to pair the audio-video file including native language audio material with the audio-video file including non-native language audio material for editing. The post-dubbing and pairing may include the following three ways:

Way One:

Do native dubbing for the entire film and television works as a whole to generate audio-video files (such as native language audio files) that include native language audio materials. In order to accurately match later, it is hoped that the native language spoken by the dubbing staff can last the same period with the non-native language. For example, at least ensure that the start and end time of each native language sentence and the corresponding non-native language sentence are consistent;

According to the cutting rules of non-native language audio in step 206, the created audio-video files including native language audio materials are sliced accordingly. Since attention has been paid to keeping the consistency of the beginning and ending times of sentences during dubbing, it can be based on the time axis of each cutting point of the non-native language audio to cut the native language audio file correspondingly;

After the cutting is completed, the audio-video slice including the non-native language audio material and the corresponding audio-video slice including the native language audio material are stored in the storage unit in association with each other through encoding.

The advantage of this dubbing method is that the dubbing staff can dub the entire work at once. This dubbing method can maintain the continuity of the voice intonation and emotion, and the dubbing effect is better.

Way Two:

Sort out the roles of the entire film and television works.

The dialogue script of the role is dubbed according to the role, in order to facilitate one-by-one pairing with the previous audio-video slices that include non-native language audio materials, the duration of dubbing is controlled by the corresponding effective non-native language audio-video slice after cutting.

The audio-video slices including the non-native language audio material and the corresponding audio-video slices including the native language audio material are stored in the storage unit in association with each other through encoding.

This way of dubbing can retain more of the tonal characteristics of the characters in the play, making the dubbing more vivid.

Way Three:

For each audio-video slice that includes non-native language audio material, let the dubbing staff perform the native language dubbing for the non-native language in the slice, that is, in the sentence-by-sentence mode, the audio-video slice is dubbed sentence by sentence to generate the corresponding native language audio-video slices. After the dubbing of all the audio-video slices including the non-native language audio material is completed, the audio-video slices including the non-native language audio material and the corresponding audio-video slices including the native language audio material are stored in the storage unit in association with each other through encoding.

In this way, because dubbing is performed in units of the already-cut audio-video slices, it is possible to obtain a very accurate correspondence between the non-native language and the native language. However, the intermittent in the sentence may cause the coherence in voice intonation and emotion to be worse.

Way Four:

Through the non-native language line text and time stamp in the non-native language audio-video files, the corresponding native language line text is translated and coupled with the original non-native language time stamp, and the corresponding native language audio-video are generated through speech recognition technology to realize dubbing.

It should be understood that the above-mentioned post-dubbing methods are merely examples of commonly used dubbing methods, and are not intended to be limited to such methods. Other dubbing methods in the field can also be applied to the solution of this disclosure as long as the corresponding matching between the non-native language and the native language can be achieved. For example, in addition to manual dubbing, speech recognition technology can also be used to obtain corresponding native language dubbing by inputting native language text (such as native language subtitles).

After the creation of all native language audio materials and the pairing with non-native language audio materials are completed, in step 9212, the system uses each grade of the audio-video slices including non-native-language audio material as the grading basis, and generates and stores bilingual spliced audio-video files corresponding to each grade. The steps are similar to the process described in step 8112, and will not be repeated here.

In other embodiments, the input audio-video files that include non-native language audio materials may not be physically cut, but may be cut in the form of switching point annotations according to linguistic modules (such as "sentences") to obtain virtual audio-video slices. After that, virtual splicing and merging can be performed on this basis to realize the construction of bilingual spliced audio-video files. This is because the input audio-video files that include non-native language audio materials are usually accompanied by dialogue line text attached to the timeline. If there is no line text, it can also be very convenient to use voice recognition technology or manual axis to adjust each linguistic module, such as sentences, to generate line text with start and end timestamps, such as subtitle files in SRT format.

Therefore, based on this feature, the specific steps of the virtual cutting and virtual merging may include:
1) Perform a "virtual slice" for each linguistic module in the line text (for example, by "sentence"), that is, generate a corresponding data packet containing cutting instruction parameters, including but not limited to: virtual slice number, start and end switching point timestamp for virtual slice, the text corresponding to the virtual slice, and the non-native language audio corresponding to the virtual slice. It needs to be clarified that the timestamp of the start and end switching point is not equal to the start and end timestamp of the linguistic module in most cases, because there will be gaps in the dialogue of audio-video files. Therefore, the virtual switching point is usually in the middle of the gap, rather than at the both ends of the gap. It ensures smooth bilingual switching after combination. In this way, virtual slicing of audio-video files can be realized.
2) According to the grading model constructed based on the linguistic parameters of the virtual slice, to grade the virtual slice. This step is the same as the video file slice on the physical level. The method is also applicable to virtual slicing.
3) Perform the paired editing of the virtual slice including non-native language audio material and the audio-video file including the corresponding native language audio material. This step is similar to the pairing process of the aforementioned physical-level audio-video slice. The aforementioned pairing process for audio-video slice at physical-level is also applicable to the virtual slice. The only difference between the two is that the pairing can also use the start and end switching point timestamp to identify the part of the audio-video file including the native language audio material that corresponds to the virtual slice including the non-native language audio material.
4) Generate corresponding bilingual spliced audio-video files for each grade. The above-mentioned merging of slices at the physical level refers to: the sliced audio-video slices of two different languages are re-assembled according to the grading rules and the pairing relationship to form an independent bilingual composite audio-video file. The virtual splicing with virtual slices can use a language audio-video file (for example, audio-video files that include non-native language audio materials) as a complete basic audio-video file, and on the basis of which, according to the cutting instruction parameters in the virtual slice, to replace at the specified switching point the corresponding part of the basic audio-video file with a virtual audio-video slice in another language to generate a new bilingual spliced audio-video file.

In order to enable the technicians to better understand the solution of the present disclosure, a specific example will be described below to illustrate the specific work flow of the solution. In this example, English is the non-native language and Chinese is the native language. It should be noted that although this disclosure is mainly for cutting and matching audio-video videos containing audio files, in order to describe the cutting and matching process more clearly and vividly, in the following examples, the cutting and matching are all in the form of text to represent the cutting and pairing process that cannot be visualized. Therefore, the English text provided in the following examples should actually be understood as a visual representation of audio, rather than text such as subtitles.

As mentioned earlier, first of all, the system receives audio-video files that include native-language audio materials and non-native language audio materials. In this example, the non-native language audio material can be "Hi, how are you? I am fine, thanks! And you? No, I feel very bad. I got a bad cold. I was out the whole night" (It should be understood that these words are the corresponding audio format, not text). The native language audio material can be "Hi, how are you? I'm fine, thank you! How about you? No, I feel bad. I have a bad cold. I was out all night last night (in Chinese)" (It should be understood as corresponding audio format, not text). As mentioned above, the native language audio material can be a built-in audio track in an audio-video file, or it can be audio track generated through, for example, post-dubbing.

Then, the system edits and adjusts the above-mentioned audio-video files. For example, the system removes background noise in the audio track, meaningless sentences (such as wheezing), etc. The editing and adjustment of the audio-video file is a data cleaning process commonly used in speech recognition technology. Therefore, the process will not be described in detail.

Next, the system slices (slices) the audio-video file including the non-native language audio material. As mentioned above, the system can cut the entire audio-video file in sentence units, or it can be cut in units of words, phrases based on non-native language characteristics. In the English example here, it is generally divided into sentences. The specific slicing process has been clearly recorded in step 8106, and the slicing is also a necessary step in the speech recognition technology. Therefore, the specific slicing process will not be described in detail here. Based on commonly used audio-video editing tools, software or technologies, the English audio files in the above examples can generally be sliced into the following audio-video slices:

AS1: Hi
AS2: How are you
AS3: I am fine
AS4: Thanks
AS5: And you
AS6: No
AS7: I feel very bad
AS8: I got a code
AS9: I was out the whole night.

Subsequently, the sliced audio-video slices are graded to distinguish grade for the non-native language included in each audio-video slice. The slicing process is implemented by using a grading model, which is adaptively updated according to the newly added/decreased parameters for grading as the project progresses.

To this end, a grading model including several grade coefficients (parameters) and grading algorithms associated with audio-video slices can be provided to facilitate the calculation of the grade of the audio-video slices. These grade coefficients (parameters) set the rules for information collection. For example, some examples of grade prameters that can be used for grading are those parameters mentioned-above in Categories I-IV.

The above parameters in Categories I-IV are some examples of grade parameters that can be used for video file slices. It should be understood that these parameters are only shown for illustrative purposes, rather than the grade parameters are limited to these parameters. Technicians can choose more or fewer parameters to use as grading according to the application scenario and the characteristics of the non-native language.

Among them, mouth shape habit and oral muscle pronunciation habit are used to reflect the adaptability to non-native language learners who do not use certain specific pronunciations in the language system. For example, the lisping consonant /θ/ in English requires the tongue to be curled against the upper teeth to pronounce. This is an unaccustomed mouth shape for many non-native language learners, and a new mouth shape needs to be used to train the oral muscles to form a new pronunciation habit. Compared with usual consonants such as /p/, the difficulty increases and it takes longer to form a habit.

Among the above-mentioned parameters, the number of "syllables", "phonemes" and "phones" occupies a very important position in the level parameters.

In the context of native language acquisition, the order of language acquisition is "listening, speaking, reading, and writing", and listening and speaking is much earlier than reading and writing. Without the interference of words, the difficulty (level) of the language material is largely based on the number of sounds pronounced. The current mainstream units for defining pronunciation are syllables and phonemes.

"Syllable" is the basic unit of speech, and it is also the phonetic unit that expresses meaning. It is the carrier unit of the morpheme as the smallest combination of phonetics and meaning in the language.

"Phone" is the smallest phonetic unit divided according to the natural attributes of the speech. It is analyzed according to the pronunciation actions in the syllable, and an action constitutes a phoneme.

They are the basic units for defining pronunciation, but neither of them can reflect the actual pronunciation.

For example:
Please: 5 phones, 1 syllable, but need to pronounce [p]–[li:]–[z], 3 sounds;
Thanks: 6 phones, 1 syllable, but you need to pronounce [θæŋ]–[k]–[s], 3 sounds;
How are you: 6 phones, 3 syllables, you only need to pronounce [haʊ]–[ɑ:]–[ju], 3 sounds.

At present, there is no precise method to specifically count the actual number of voices in different language learning. Therefore, the solution of the present disclosure regards the actual number of voices as the most important basis for dividing the grade of language audio-video slices (here, it is named "phonemes"). Using this phonemes, combined with other phonetic and linguistic grading parameters, it forms a systematic grading system, which can most truly restore the advanced experience of listening and speaking in the native language acquisition scene.

Specifically, the "phoneme" is a pronunciation unit between "phone" and "syllable", which is mainly divided according to the natural pause in the natural language pronunciation, and it can represent the word to a large extent. The actual number of voices. For example, "Please" is composed of 5 phones to form 1 syllable, but the lips need to pronounce [p]–[li:]–[z], 3 sounds, that is between [p] and [li:]. There is a pause in between, and there is also a pause between [li:] and [z]. Therefore, we can set it to include 3 sounds, that is, when reading "Please", the actual number of sounds is 3. And a word has several phones, that is, the actual number of sounds is directly related to the difficulty of pronunciation of the word. By introducing the concept of "phoneme", a more intuitive and accurate tool for grading sentences. Table 2 shows the relationship between phonemes, syllables, and phonemes of example sentences in some languages.

TABLE 2

| Language | Materials | Phones | Syllables | Phonemes |
|---|---|---|---|---|
| English | How are you | 6 | 3 | 3 |
|  | Thanks | 4 | 1 | 3 |
|  | Please | 5 | 1 | 3 |
| Chinese | China | 6 | 2 | 2 |
| Japanese | chottomatte | 8 | 4 | 4 |

Obviously, the number of phonemes is actually more able to reflect the actual number of pronunciations of each sentence. Therefore, when calculating the grade of a sentence, the present disclosure sets the weight of "phonemes" higher to fully reflect the importance of the actual number of sentences uttered at the grade.

After determining the grade coefficients used for grading, the solution of the present disclosure sets the weight of each grade coefficient in the grading, and for each cut audio-video slice, it can be based on the value in the audio-video slice to be graded. The audio-video feature and the text feature set the value of all the grade coefficients for the information collection rule.

For example, the weight of the video slice time length parameter p1 can be set to 100%, the value of the slice "Hi" parameter p1 can be set to 1 (the shortest duration), and the weight 2 of the sound sub parameter p4 can be set to 90%, the value of the parameter p4 of the slice "Hi" can be set to 1 (one tone), . . . . The weight of the grade coefficient can be set according to its influence on the sentence level classification. The greater the influence, the higher the percentage. The setting of the weight can also be continuously adjusted according to the experience in the actual application to better meet the real level.

The setting of the value of each grade coefficient of the audio-video slice can be determined by calling the corresponding statistics provided by the model according to the attributes of the slice itself, such as the slice duration counter, the slice phone counter, the slice syllable counter, and the slice phoneme counter, in-slice word counter, in slice character counter, etc.

Among them, the slice phoneme counter is also a data model. By inputting different slice samples, the model can be adjusted and optimized by comparing the difference between the statistical value of the model and the artificial statistical value. For example, in English: the beginning of a vowel is increased by a number of phoneme, and the end of n is decreased by a number of phoneme, etc. New rules can be refined to further modify the model.

In addition to the use of statistics, the values of some parameters may need to be assigned based on experience, such as oral muscles vocal habit, such as the lisping consonant in English, the uvula consonant in German, and so on. Technicians can assign values to these parameters based on actual pronunciation experience.

In this way, the grading model can construct an audio-video slice-grade coefficient reference table for the example audio-video file, as shown in above mentioned Table 1.

After the audio-video slice-grade coefficient reference table is constructed using the grading model, the grading calculation algorithm can be used to calculate the corresponding grade for each audio-video slice.

For example, according to our research on English language grammar, pronunciation and learning experience, for various parameters, a reasonable classification algorithm can be:

$$L=[(p1*w1)+(p2*w2+p3*w3+p4*w4+p5*w5+p6*w6)]/2*(q1*w7+q2*w8+q3*w9+q4*w10+q5*w11)*(s1*w12+s2*w13)*(s3*w14+s4*w15)*(m1*w16+m2*w17+m3*w18+m4*w19+m5*w20).$$

For example, the grade for "Hi"

$$L=[(1*100\%)\pm(1*90\%+1*4\%+2*3\%+1*2\%+2*1\%)]/2*(1*40\%+1.2*30\%+1*10\%*1.2*10\%+1*10\%)*(1*80\%+1*20\%)*(1*50\%+1*50\%)*(1.1*50\%+1*20\%+1*10\%+1*10\%+1*10\%)=1.1016,$$

which is 1 after rounding, that is, the grade of the audio-video slice "Hi" is 1, which is very low. The rounding operation is the result of comparing the calculated value with a threshold value, that is, comparing with the threshold value 1.5 based on the principle of rounding. If it is greater than 1.5, it will be 2 and if it is less than 1.5, it will be 1.

For another example, the grade for "I was out the whole night"

$$L=[(7*100\%)+(9*90\%+6*4\%+14*3\%+6*2\%+19*1\%)]/2*(1.2*40\%+1*30\%+1.2*10\%*1*10\%+1*10\%)*(1*80\%+1*20\%)*(1*50\%+1*50\%)*(1.1*50\%+1*20\%+1*10\%+1*10\%+1*10\%)=8.8830,$$

which is 9 after rounding, which means that the audio-video slice "I was out the whole night" has a grade of 9, which is very high.

In addition to the above classification algorithm, other calculation formulas can also be used to calculate the level L, for example:

$$L=[(p1*w1)+(p2*w2+p3*w3+p4+w4)+(p5*w5+p6*w6)]/3*[(q1*w7+q2*w8+q3*w9+q4*w10+s1*w11)+(s3*w14+s4*w15)]/2+(s3*w14+s4*w15)+(m1*w16+m2*w17+m3*w18+m4*w19+m5*w20).$$

It should be understood that the various grade coefficients (parameters), weights, and their values shown in Table 1 above are given for illustrative purposes. According to the characteristics of the native language and non-native language, more or fewer parameters and different weights and values can be applied to the grading model, and the present disclosure is not limited to the examples shown above. For example, for a new user, there is a lack of user characteristics and historical data in the aforementioned parameter m5, and therefore, it can be excluded from the calculation of the grade.

By analogy, after applying the above algorithm to calculate according to Table 1, the grade table of each audio-video slice can be obtained, namely above mentioned Table 2:

TABLE 2

| AS1 | AS2 | AS3 | AS4 | AS5 | AS6 | AS7 | AS8 | AS9 |
|-----|-----|-----|-----|-----|-----|-----|-----|-----|
| 1 | 3 | 4 | 3 | 2 | 1 | 6 | 8 | 9 |

At this point, the grading step of audio-video slices is completed.

Figure 11A:
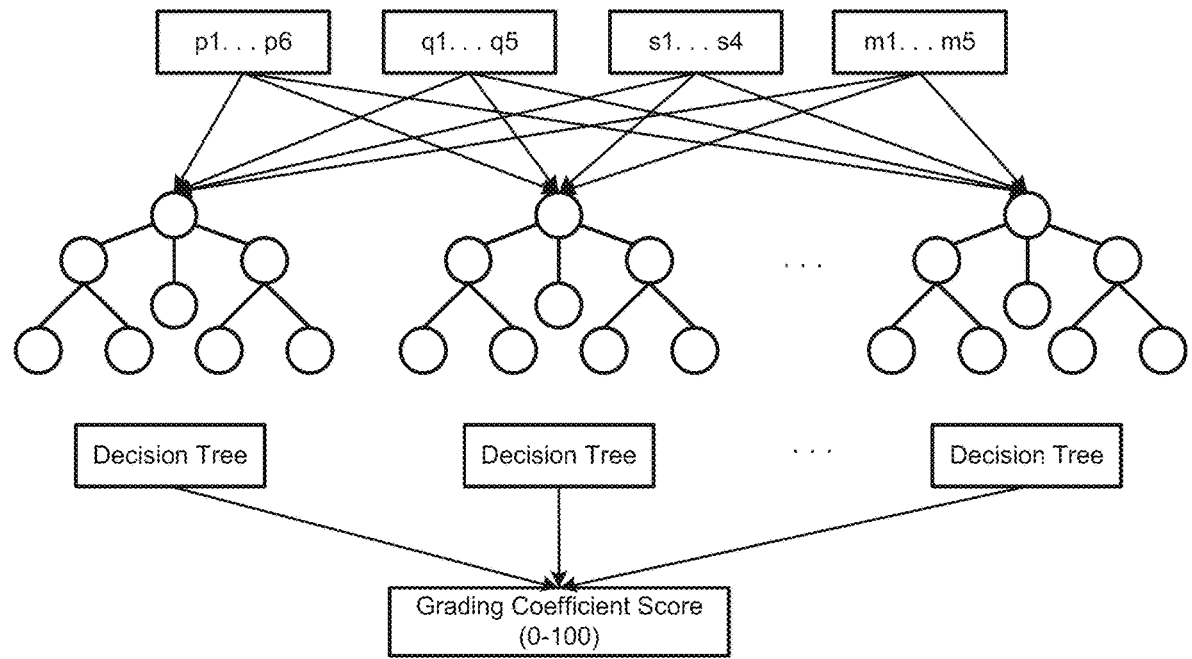
FIG. 11A is conceptual diagram of a random forest regression model based on speech level coefficient according to some embodiments of the present disclosure.

In addition to the above grading algorithm, other methods can also be used for grading, for example:
Model 1: Grading Model of Random Forest Regression Model Based on Parameters
Model Introduction:

This model is a random forest regression model based on speech level coefficients, which is used to grade human speech in the range (0-100). The conceptual diagram of the model is shown in FIG. 11A.

Modeling Logic

The characteristic of this model is the application of integrated learning method combined with multiple decision trees, so that the weak learning model can form a strong learning model in an integrated manner. The model logic is to put all samples into the random forest model, randomly generate and tune N decision trees, and take the average output of these N decision trees as the output of the entire random forest.

After the model is completed, the system can output the grade coefficient score of the sentence by inputting, for example, the 20 parameter values of any sentence into the model.

Implementation

Input: 4 categories of coefficients and 20 variables
Output: grade coefficient score (0-100)
Modeling Method:
1. For any language, randomly selecting samples to generate training data eigenvalues (20*M matrix, M is the sample size), and the grade coefficient scores of training data are evaluated by, for example, 100 senior translators and take the average value as the target value (1*M vector), where the number of translators can be changed according to requirements.
2. Taking, for example, 70% of the training samples used to train the model and become the training set, and the remaining 30% become the validation set. Inputting the eigenvalues of the training set into the random forest calculation method, and using GridSearchCV to optimize the parameters of the random forest algorithm (such as the number of decision trees in the forest N, the maximum depth D, the minimum sample size of the node L, etc.), to make the Mean Square Error (MSE) is the smallest. The proportions of the training samples and verification samples can be adjusted as needed to adapt to different application conditions.
3. Applying the model to the validation set to view the model performance, such as MSE, R2, etc. This process is used to evaluate the model and prevent overfitting.
4. After the performance of the model is optimal, the output initial score can be mapped to the range of 0-100 to form the final score.

Figure 11B:
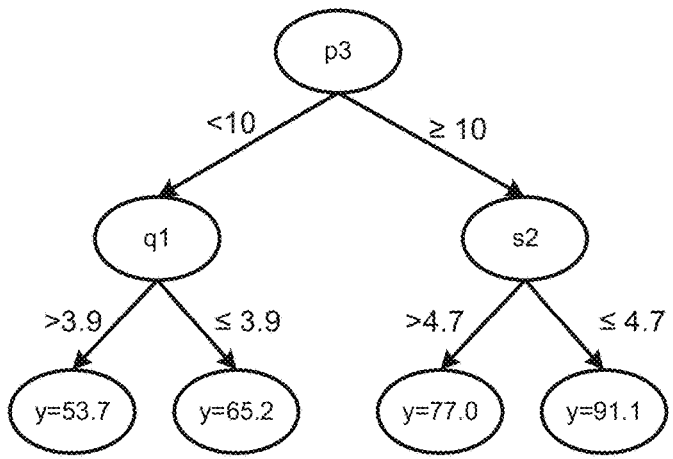
FIG. 11B is a diagram illustrating an exemplary application of a random forest regression model on speech level coefficient according to some embodiments of the present disclosure.

Examples of Scenarios:

Taking English as an example, if we get the coefficient set (X) of 10,000 audio files and the average score (y) of the corresponding evaluation level of 10,000 senior translators. X is a 20*10000 matrix, and y is a vector with a dimension of 10000. Putting 70% (7000 samples) of this training set into the random forest regression model, and using the remaining 3000 samples as the validation set. Supposing we intend to build a random forest of 100 regression trees (here N=100 can be automatically tuned to the best forest size by the program in practice), then each tree will be randomly divided into M samples for training the tree (M is an integer less than or equal to 7000). For example, if M is 1000, then each tree will be replaced with 1000 samples as the training set. Then from the total 20 parameters, each tree will randomly sample the coefficients, and extract k (k≤20)

coefficients for the growth of the regression tree. A regression tree corresponds to the division of the feature space (k) and the output value on the division unit. For any tree, the model traverses all input variables and finds the optimal sliceation variable j and the optimal sliceation point s to divide the input space, wherein j and s are obtained by division error, namely $$\sigma^2 = \sum_{x_i \in Rk} (y_i - f(x_i))^2$$

wherein f($x_i$) is the mean value of each target in the divided space (mean value of grade score). To obtain the smallest $\sigma^2$, then the node having j and s is selected them as the root node. For example, in the sample obtained by tree A, assuming that the parameters p3 (the number of syllables contained in the sentence) and 10 are the optimal sliceation variable j and the sliceation variable s, respectively, then the root node of tree A is p3, and the two branches are <10 and ≥10, respectively. In the next step, the model will repeat this method and continue to obtain new nodes and branches on the two branches until the square error of the tree is less than a predetermined threshold or other constraints set by the designer (such as the maximum depth of the tree, the minimum number of samples of leaves, etc.) is satisfied. Taking tree A as an example, assuming that the model stops when the threshold of the square error is less than 1, tree A may have a tree shape as shown in FIG. 11B (the tree result shown in FIG. 11B is for illustration, and the real tree may reach more than ten or even dozens of levels).

Because the input samples are different (sample individuals and parameter groups), each tree in this forest may be different. Therefore, the output of the forest model is to reduce the possible model deviation of a single regression tree by averaging the predicted values obtained from all trees. Thereafter, a validation set of 3000 samples will be used to verify the effectiveness of the forest model. The validated model can be used to make scoring predictions for generalized audio data.

For example, take the AS7: "I feel very bad" column and its corresponding 20 parameter values in Table 1 as an example. When it is put into the model, each regression tree will be entered in order to obtain a score. For example, in tree A, this sentence will be assigned to the group y=65.2 following the path of p3 (<10)→q1(<1.3)→y. Then every tree in tree B, tree C, and even the entire forest gets a score yi. Summing the yi on all trees and taking the average value becomes the y score output by the model, which is the grading score of the sentence AS7:"I feel very bad". Subsequently, according to the relationship between the grading score of the sentence and the threshold of the grading level, the sentence is assigned to the corresponding grading level. In this way, based on the random forest regression model, the grading model can also be realized.

Model 2: RNN-Based Speech Recognition Grading Model

Model introduction: Recurrent Neural Network (RNN) refers to a structure that recurs over time. This deep learning model has a wide range of applications in many fields such as natural language processing (NLP) and speech images because it incorporates the continuity of sequence input data. The RNN model can realize the memory function of speech learning, and retain certain information on the processed data to assist the interpretation of the next piece of information. This model uses the Long Short-term Memory (LSTM) algorithm to perform language recognition on the audio. The output after recognition is compared with the real sentence. The similarity coefficient can be mapped to a 0-100 level grading space to generate a language grading score.

Figure 12A:
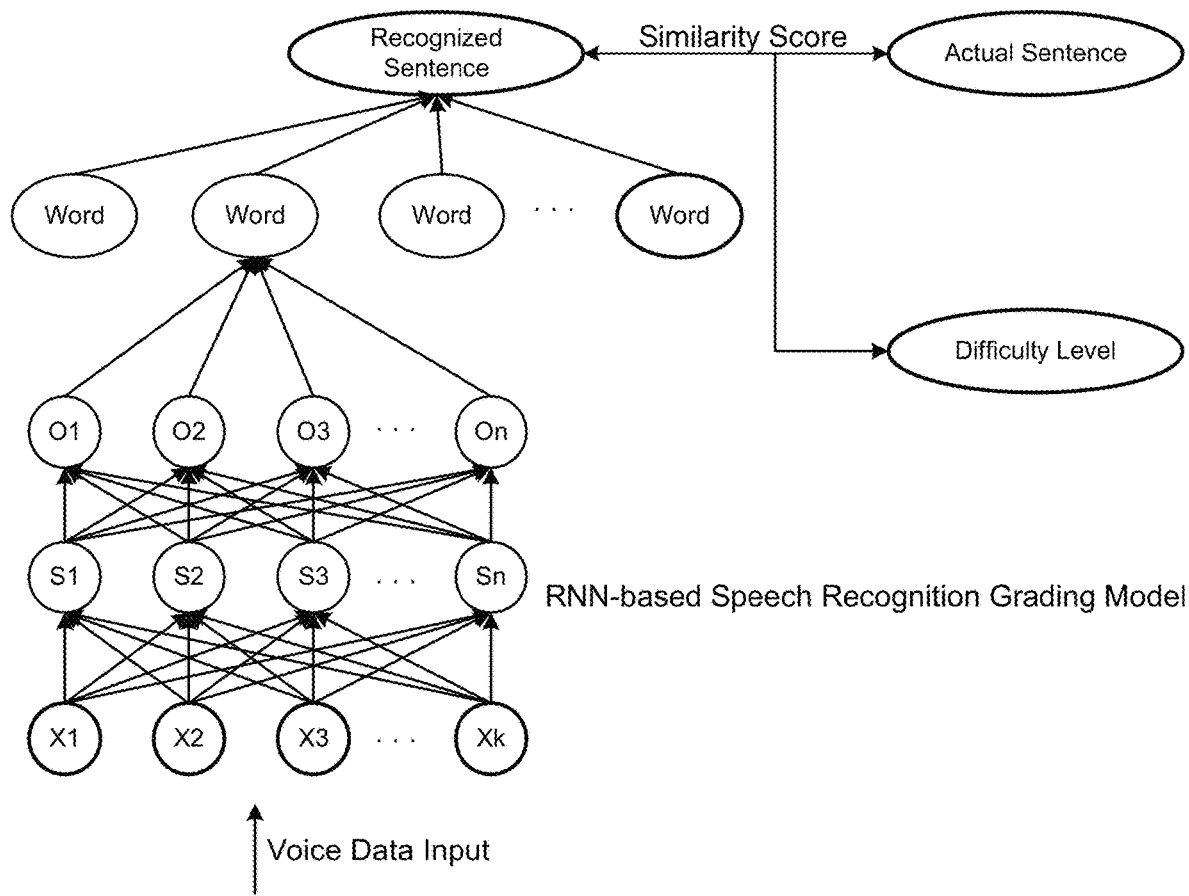
FIGS. 12A and 12B are diagrams illustrating an RNN-based speech recognition grading model according to the some embodiments of the present disclosure.

The conceptual diagram of the model is shown in FIG. 12A.

Modeling Logic:

This model is based on the tensor of audio data, and an RNN model based on the LSTM algorithm is set up. The voice in the audio file enters the model in the form of a data tensor. The model has multiple layers, from the input layer→pre-trained model→LSTM layer→activation layer→dropout layer→LSTM layer→activation layer→fully connected layer→output. The voice data entering the model is transformed into recognized sentences by the model. The recognized sentence will be compared with the actual sentence and a similarity score will be generated. The core logic is: the deep learning model trained can simulate the process of human speech recognition. If the model itself reaches a certain recognition level, it still has a deviation in recognizing certain speech and the output similarity score is very low, then the human recognizing the sentence will also be more difficult. In order to facilitate interpretation, the similarity score (%) can be mapped to a range of 0-100 to become a language grading score.

After the model is completed, the system can input the voice data of any sentence into the model to output the grade score of the sentence.

Implementation:

Input: Voice data

Output: Level rating score

Figure 12B:
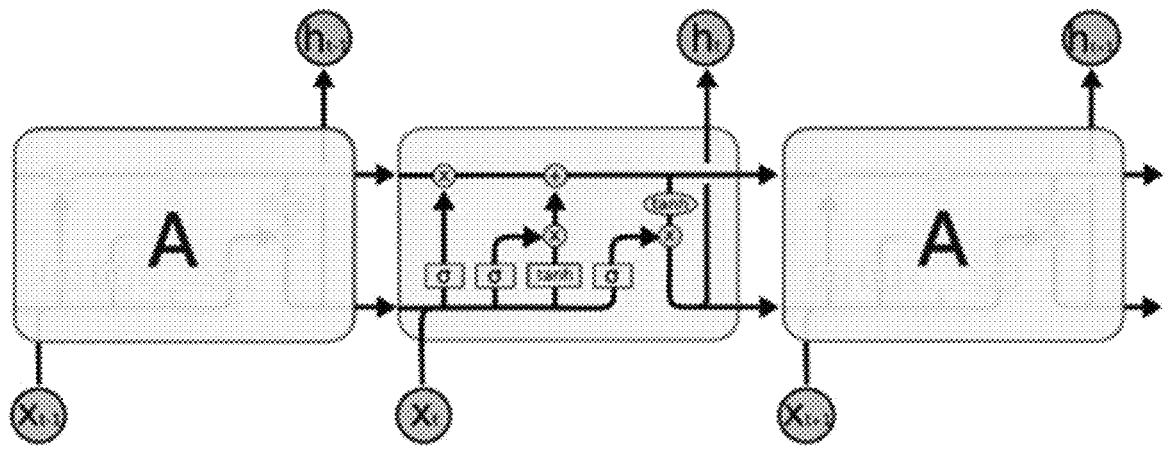

Modeling Method:

Randomly selecting speech samples with target sentences to generate training data tensor. 70% of the speech samples are used as the training set, and the remaining 30% are used as the validation set. The training set is put into the RNN network with pre-trained speech model to train the model. Validation set is used to check the model performance. The model is used to recognize and output speech. The similarity between the recognized speech and the original text is calculated. The similarity is s∈[0,1], which is reversely mapped to the range of [0,100] as the Language Grading Score Examples of Scenarios:

Still taking English audio as an example, suppose 10,000 audio data sets in units of sentences and sentence texts corresponding to the audio data are input. The audio data set may be a tensor shape of [M,N,K], then this data set is a tensor shape of [M,N,K,10000]. The training set and the validation set are extracted according to 7:3 (the extraction ratio can be flexibly adjusted according to needs). The training set will be put into the model and processed layer by layer. Input layer→Pre-trained model→LSTM layer→Activation layer→Dropout layer→LSTM layer→Activation layer→Fully connected layer→Output. The input layer can obtain the word vector for this speech recognition through the pre-training model. The word vector is spliced onto the original data as a newly added layer of data and input to the LSTM layer. The LSTM layer has the structure shown in FIG. 12B to simulate the memory model, which includes an input gate, a forget gate and an output gate, which manage the entry of information, the reading of memory (information at the last time point), and the forgetting of information, respectively.

For example, take the "I love apple" non-native language audio-video slice as an example. After including the word vector, $X_{t-1}$=[I,$v_{t-1}$], $X_t$=[Love,$v_t$], $X_{t+1}$=[apple,$v_{t+1}$].

After entering the LSTM model, "I" is used as the attributes of the subject and pronoun. The subject attribute is useful for predicting the next word, because the predicate will be added after the subject, which is helpful for judging "love," then this part of the information will transferred to the processing of the next data Xt in the form of tensor. At the same time, "I" as a pronoun has no meaning for the judgment of the next word, and it will be forgotten. Applying this model, all the data will train the various parameters of this LSTM neuron layer together.

Similarly, the data that has passed the LSTM layer will go through the activation layer to activate the nonlinear model, the Dropout layer to randomly retain part of the data, and the final fully connected layer to output the word vector combination that can be translated into text, that is, the recognized sentence. The deviation of the final recognition result will be returned to the model as the next training optimization parameter, which is the backpropagation (BP) method.

After detection and optimization, this model can be used to recognize sentences in audio files. The recognized sentences will be compared with the real text to generate a grade score. For example, if "I love apple" is interpreted as "I lose apple", and its similarity is recognized by the algorithm as 65%, the grade score is (1-63%)=35 points. The grade score obtained can be compared with the threshold value of the grading level, so as to assign a corresponding grading level to the sentence. In this way, RNN-based speech recognition can also implement the grading model.

In addition to using the above-mentioned grading model based on linguistic parameters to grade the audio-video slices, other grading methods can also be used.

For example, the audio-video slices can be graded based on the age dimension of the user. The grading based on the age dimension may consider one or more of the following factors:

Dividing purely by the age or age group of the audience;
Dividing by age at school;
Based on the age of the audience, combining with various aspects of their language ability as the division of adjustment parameters;
Based on the age level setting of the content itself (for example, some video files themselves restrict the age of the audience that can be viewed, such as 15+ or 18+).

The following is a detailed description of the age-based grading scheme with reference to specific examples.

Specifically, the grading can be based on two perspectives: one is the age of the audience, and the other is the actual age of the user. For example, it can be included as an input parameter to be considered for grading from the following perspectives:

Age-based listening and cognitive abilities;
Language expression ability based on age;
Accumulation of language information based on age;
Age-based level of intellectual development (such as extracting language rules from repeated language information).

What needs to be explained is that, as to the non-native language proficiency for a specific area and a specific target, the grading based purely on age is not very accurate. For example, in the context of learning English as a non-native language in China, the English proficiency of children of the same age in different city levels in first-tier cities, second-tier cities, and third-tier cities is very different, and the age at which English is taught as a subject is also different. English is taught at the first grade of primary schools in 1st-tier cities, and English may not be taught until the 3rd grade in cities from 3 to lower tiers. Therefore, grading based on age alone is not very recommended. In practical applications, it is also necessary to make appropriate adjustments in combination with other factors such as geographical location to make the grading more valuable.

Another age-based perspective is to start from the content itself. When producing different content, the age group of the audience and the cognitive ability corresponding to its age group will be considered, and the scene setting of the audio-video, plot dialogue, etc., need to be planned appropriately, for example:

At the early stage of 1-3 years old, the audience's favorite form is singing and dancing. This age group is easier to accept such a form, and the characters will be mainly animals, and the story itself is not full.

At the young age of 3-5 years old, at this time, children have certain requirements for entertaining content and storyline of the content itself. Producers usually also set roles corresponding to their age, and the plot and dialogue are also set to match the audience of this age group, which is easy for children to understand.

At the age of 6-10 years old, children in this age group have higher requirements for fun, knowledge, etc. Forms such as singing and jumping, and younger roles cannot meet their requirements, but adult-oriented ones such as knowledge lectures and speeches are too boring. Therefore, it is possible to add more interactive game content to help learning.

In short, different content itself also has its own age attribute, therefore, it can also be based on the appropriate age range for the content of the audio-video slice as the basis for grading.

In addition to age, in some embodiments, we can also grade audio-video slices based on experience.

Specifically, the audience's own experience in non-native languages can also be used as a basis for grading. In practical applications, the audience is usually asked to choose a self description based on experience value, and the system generates an initial experience value, or the audience directly selects a level according to experience value based on their own experience judgment. The determination of the empirical value may be based on, for example, one or more of the following factors:

Estimated vocabulary that users have recognized before contacting this product;
The length of non-native language time the user has been exposed to before contacting this product;
The number of non-native language learning applications that users have come into contact with before contacting this product;
The length of training the user has participated in before contacting this product.

The above factors are just examples of some of the expressions of experience value. The technical personnel can combine other parameters that can reflect the learning experience value according to the actual situation, which is also within the protection scope of this application.

In other embodiments, the grading of audio-video slices can also be performed based on the test capability.

Specifically, a test based on the audience's non-native language ability can also be used as a basis for grading. In actual applications, a test is usually provided before the official service starts, and the system will set the user's starting level based on the result of the test. The factors considered in the test can include one or more of the following:

The user's non-native language vocabulary at the current stage;

The user's non-native language grammar ability at the current stage;

The user's non-native listening ability at the current stage;

The user's non-native language expression ability at the current stage.

The above factors are only examples of expressions of part of the test dimensions, and technicians can combine other reaction test parameters according to actual conditions, which are also within the protection scope of this application. In some other embodiments, the audio-video slices may be graded based on, for example, the user's occupation, test scores, educational background, school and major, and other dimensions. Therefore, the skilled person should understand that the various grading manners of the examples are only given for illustrative purposes, and the grading is not limited to the above-mentioned manners. Other application methods that can achieve grading are also within the protection scope of this application.

After the grading of all audio-video slices is completed, for each audio-video slice that includes non-native language audio materials, the pairing and editing process of the audio-video files that include native language audio materials is performed. The matching includes comparing the images, timestamps, or sounds of the two, and cutting out the audio-video slices including the corresponding native language audio materials from the audio-video files including the native language audio materials. Taking the previous example as an example, Table 3 shows the audio-video slices of the paired non-native language audio and the audio-video slices of the corresponding native language audio (audio pairing, not text pairing):

TABLE 3

| Non Native Language Audio | Native Language Audio |
|---|---|
| Hi | Hi (in Chinese) |
| how are you? | how are you? (in Chinese) |

TABLE 3-continued

| Non Native Language Audio | Native Language Audio |
|---|---|
| I am fine, | I am fine, (in Chinese) |
| thanks! | thanks! (in Chinese) |
| And you? | And you? (in Chinese) |
| No, | No, (in Chinese) |
| I feel very bad. | I feel very bad. (in Chinese) |
| I got a bad cold. | I got a bad cold. (in Chinese) |
| I was out the whole night. | I was out the whole night. (in Chinese) |

Subsequently, based on the respective grades of the audio-video slices including the non-native language audio, a bilingual spliced audio-video file corresponding to the grade is generated for each grade.

Specifically, the specific steps for generating bilingual spliced audio-video files are as follows:

1. Arrange a list of grades associated with the audio-video slices of the film and television work in order from low to high, for example.

2. For each grade in the list, a bilingual spliced audio-video file of this grade is generated, and its duration is the same as the original input audio-video file including non-native language audio, but the presentation rule is: in the bilingual spliced audio-video file, those audio-video slices having a grade equal to or smaller than a given grade are presented with audio-video slices that include non-native language audio materials, and those audio-video slices having a grade larger than the given grade are presented with audio-video slices that include native language audio materials.

Still taking the example audio-video files above as an example, Table 4 shows the audio-video files of different grades that have been bilingually spliced. It should be understood that although each bilingual sentence is shown in text, the English and Chinese sentences actually represent the corresponding audio pronunciation.

TABLE 4

| Bilingual | AS1 | AS2 | AS3 | AS4 | AS5 | AS6 | AS7 | AS8 | AS9 |
|---|---|---|---|---|---|---|---|---|---|
| Grade 1 | Hi | How are you (in Chinese) | I am fine (in Chinese) | Thanks (in Chinese) | And you (in Chinese) | No | I feel very bad (in Chinese) | I was out the whole night (in Chinese) | I got a bad cold (in Chinese) |
| Grade 2 | Hi | How are you (in Chinese) | I am fine(in Chinese) | Thanks (in Chinese) | And you | No | I feel very bad(in Chinese) | I was out the whole night (in Chinese) | I got a bad cold (in Chinese) |
| Grade 3 | Hi | How are you | I am fine (in Chinese) | Thanks | And you | No | I feel very bad(in Chinese) | I was out the whole night (in Chinese) | I got a bad cold (in Chinese) |
| Grade 4 | Hi | How are you | I am fine | Thanks | And you | No | I feel very bad(in Chinese) | I was out the whole night (in Chinese) | I got a bad cold (in Chinese) |
| Grade 5 | Hi | How are you | I am fine | Thanks | And you | No | I feel very (in bad Chinese) | I was out the whole night (in Chinese) | I got a bad cold (in Chinese) |
| Grade 6 | Hi | How are you | I am fine | Thanks | And you | No | I feel very bad | I was out the whole night (in Chinese) | I got a bad cold (in Chinese) |

TABLE 4-continued

| Bilingual | AS1 | AS2 | AS3 | AS4 | AS5 | AS6 | AS7 | AS8 | AS9 |
|---|---|---|---|---|---|---|---|---|---|
| Grade 7 | Hi | How are you | I am fine | Thanks | And you | No | I feel very bad | I was out the whole night (in Chinese) | I got a bad cold (in Chinese) |
| Grade 8 | Hi | How are you | I am fine | Thanks | And you | No | I feel very bad | I was out the whole night (in Chinese) | I got a bad cold (in Chinese) |
| Grade 9 | Hi | How are you | I am fine | Thanks | And you | No | I feel very bad | I was out the whole night (in Chinese) | I got a bad cold |

After the bilingual spliced audio-video files generated for different grades are stored in a separate storage unit for the user to play, the example process of the method for combining multi-language audio-video files by grades ends.

Figure 10:
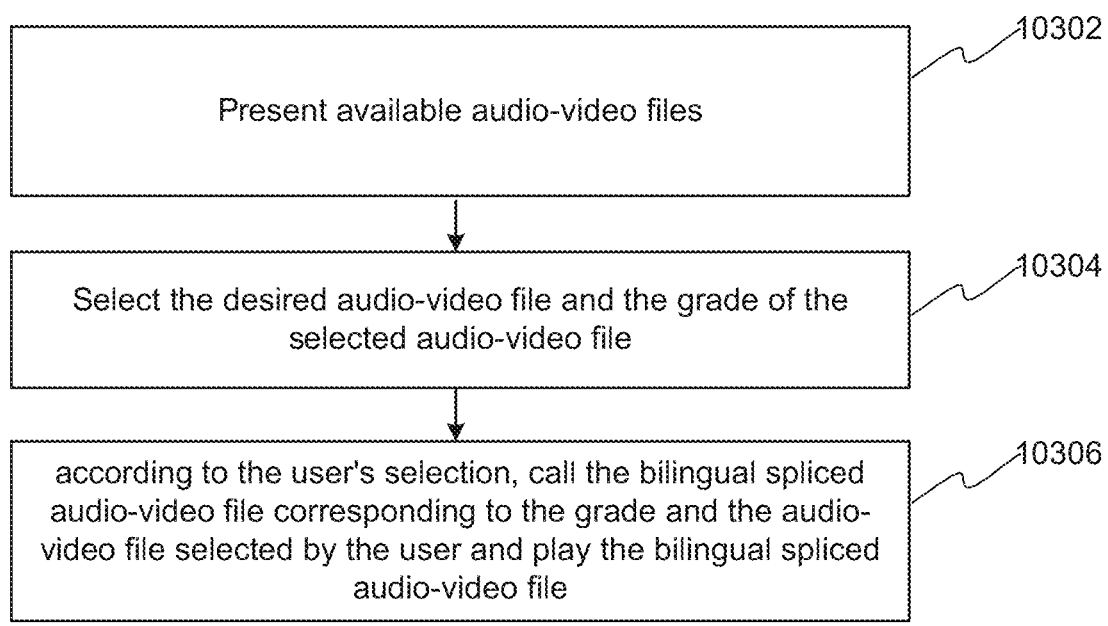
FIG. 10 is a flowchart illustrating a method for playing multi-language spliced audio-video files according to grades according to an embodiment of the present disclosure.

The following describes an example flowchart of a method for playing multi-language spliced audio-video files according to grades according to an embodiment of the present disclosure with reference to FIG. 10.

When the audio-video files that include non-native language audio materials are graded and spliced according to the method shown in FIGS. 8 and 9 for combining audio-video files in multiple languages (for example, bilingual), the processed audio-video files can be spliced. The file is used for, for example, bilingual teaching on-demand.

In step 10302, the available audio-video files are presented in the form of an audio-video list interface on the playback interface of each front-end playback terminal. The playback terminal at the front end may include home audio-video playback terminals, smart electronic terminals, audio-video playback terminals in educational scenarios (such as projectors, computers, etc.), in-vehicle audio-video playback terminals, and other audio-video playback terminals. The playback interface may be, for example, a video-on-demand website, a social media playback outlet, or an audio-video playback interface based on a recommendation mechanism.

Figure 13A:
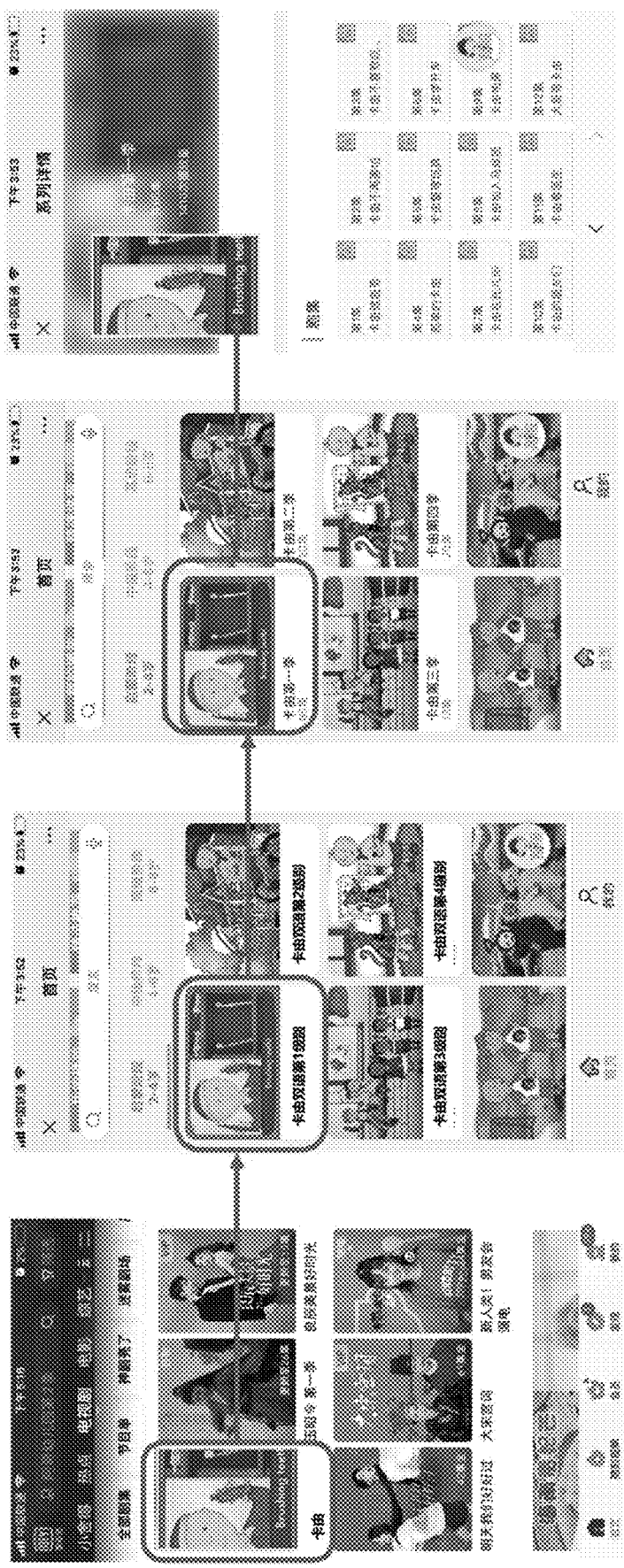
FIG. 13A illustrates an example of a video playback interface according to some embodiments of the present disclosure.

In step 10304, the user can select the desired audio-video file and the grade of the selected audio-video file according to the prompts on the audio-video playback interface. The selection process can be the following selections in sequence:

Selecting the program you want to watch→selecting the grade of the program→selecting the season and episode of the program you want to watch. This process is shown step by step in the example video playback interface of FIG. 13A; or Selecting the program you want to watch→selecting the season and episode you want to watch the program→selecting the level of the program.

Alternatively, in some embodiments, other selection methods are also allowed, such as directly selecting the last viewed audio-video from the history record, and continuing to play the video based on the grade selected previously. Alternatively, the grade of the user in mastering the non-native language is tested, and a default grade is automatically matched to the user based on the test result. In this way, when the program is subsequently selected, there is no need to select the grade again, but the bilingual spliced audio-video video associated with the grade can be automatically played according to the user's default grade. There are more options, which are not listed here.

In step 10306, according to the user's selection, the front-end playback terminal calls the bilingual spliced audio-video file corresponding to the grade and the audio-video file selected by the user from the memory and plays the bilingual spliced audio-video file.

Since the played bilingual spliced audio-video file is a bilingual spliced audio-video file generated by the method as shown in FIGS. 8 and 9 on the basis of the original audio-video file containing non-native language audio materials. Therefore, it can be played according to the user' selected grade, where non-native language audio will be played when the audio-video slices have a grade lower than the selected grade, and the spliced native language audio will be played when the audio-video slices of the higher grade (beyond the selected grade) are played.

Figure 13B:
FIG. 13B illustrating an exemplary situation when an audio-video slice of the audio-video file including non-native language audio materials is played.
Figure 13C:
FIG. 13C shows the situation at the same time when the example audio-video file of FIG. 13B after the bilingual splicing is played.

For further understanding, in FIGS. 13B-13C, the audio-video files containing non-native language audio materials and the bilingual spliced audio-video files named "Kayou by Air" are shown in the form of subtitles. As mentioned earlier, it should be understood that although the native and non-native language subtitles are shown in the attached drawings, they are only for the convenience of presentation, and their essence is to play the corresponding native and non-native language audio (of course, when playing, it is also possible to display the corresponding subtitles at the same time as the audio). The video is based on Chinese as the native language and English as the non-native language.

FIG. 13B shows the situation when an audio-video slice of the audio-video file including non-native language audio materials is played. That is, an example of playing audio-video files that have not been processed by the solution described in this application. Therefore, when the video file is played, it is still played as non-native language audio.

FIG. 13C shows the situation at the same time when the example audio-video file of FIG. 13B after the bilingual splicing is played. The original non-native language audio "we would love to" exceeds the grade selected by the user. Therefore, in the bilingual audio-video slice played in FIG. 13C, after saying "Yes", the subsequent playback is to replace the non-native language audio "We are very willing (in Chinese)" native-speaking audio.

In this way, by re-splicing and playing bilingual audio-video according to slices and grades, the bilingual switching in the video files is systematically controlled, so that non-native speakers can be unified within one grade, and a large amount of accurate input and matching of non-native language learning materials is realized. While users watch audio-video fluently, it helps users to better learn and understand non-native language knowledge and improve their foreign language proficiency.

Figure 14:
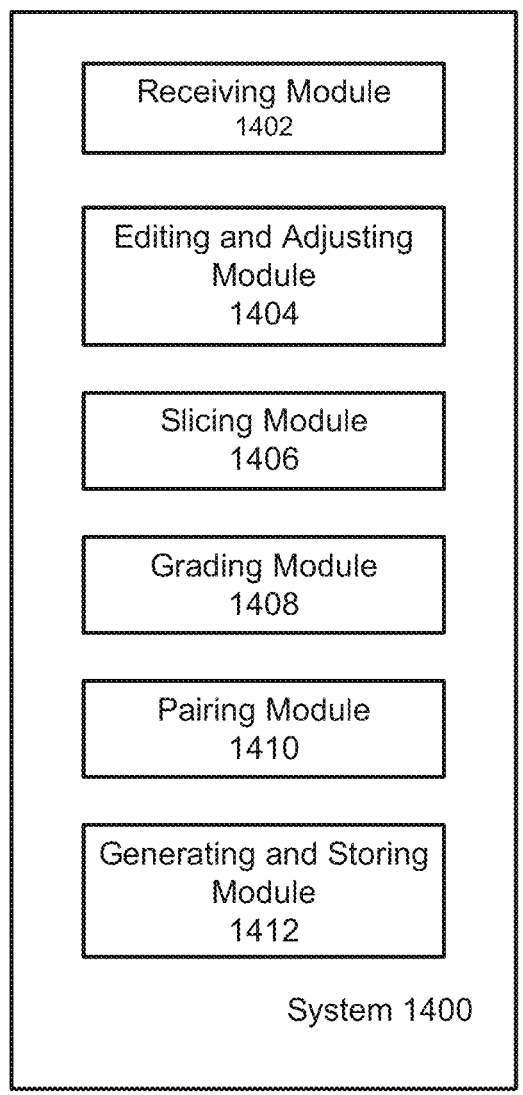
FIG. 14 shows an example system block diagram of a system for splicing audio-video files in multiple languages according to an embodiment of the present disclosure.

FIG. 14 shows an example system block diagram of a system 1400 for splicing audio-video files in multiple languages according to an embodiment of the present disclosure.

As shown in the figure, the system 1400 includes a receiving module 1402, an editing and adjusting module 1404, a slicing module 1406, a grading module 1408, a pairing module 1410, and a generating and storing module 1412. The various modules can be connected by wired or wireless communication links. The functions of the various modules correspond to the corresponding steps in the aforementioned FIGS. 8 and 9, therefore, the operations performed by the various modules are briefly described here. For more details, please refer to the corresponding steps in FIGS. 8 and 9 to understand.

The receiving module 1402 is configured to receive an input audio-video file, the audio-video file including a non-native language audio material and a native language audio material for the same content. Alternatively, the audio-video file may only include non-native language audio materials. The corresponding non-native language audio material can be obtained through dubbing in the subsequent pairing module 1410.

The editing and adjustment module 1404 is configured to edit and adjust the audio-video files that include non-native language audio materials. The editing and adjustment includes editing the start and end of the audio-video files, background noise reduction, and screening of non-learning meaning sentences, and other pre-processing operations. As mentioned above, the editing and adjustment module 1404 is an optional module. If the quality of the audio-video file itself is high, the module can also be omitted.

The slicing module 1406 is configured to perform slicing (sliceation) processing on the audio-video file including non-native-language audio materials. For example, the entire audio-video file can be sliced by sentence as a unit. The slicing can use slicing means in the existing speech recognition technology.

The grading module 708 is configured to grade each audio-video slice. The grading refers to assigning a grade to each audio-video slice file based on the linguistic parameters of each audio-video slice that has been cut and including non-native language audio material, so as to realize the grading of the audio-video slice. The grading module can perform the following operations: building a grading model, setting information collection rules, assigning and weighting the parameters involved in the information collection rules according to the characteristics of the audio-video and text, and calculating the final value and calculating based on the result of comparing the final value of the audio-video slice with the grading threshold to determine the grade of the audio-video slice.

The pairing module 1410 is configured to perform paired editing of each audio-video slice including non-native language audio material with the audio-video file containing native language audio material. The pairing may include two situations: 1) the received audio-video file itself includes native language audio materials, or an audio-video file including corresponding native language audio materials is also received; 2) the received audio-video file does not include native language audio materials.

In the first case, the pairing module 1410 can compare images, timestamps, or sounds associated with audio-video slices that include non-native language audio materials and audio-video files that include native language audio materials, and obtain the information from audio-video slices that include native language audio materials. The file is re-cut to extract audio-video slices including native language audio materials corresponding to the non-native language audio materials in the audio-video slices, and store them in the memory in association with each other.

In the second case, the pairing module 1410 can match each audio-video slice containing non-native language audio material to a corresponding audio-video slice including native language audio material by means of post-dubbing.

The generating and storing module 1412 is configured to generate and store a bilingual spliced audio-video file corresponding to the grade for each level based on the level of the audio-video slice including each non-native language audio. Specifically, the generating and storing module 1412 may perform the following operations:

1. Arranging a list of grades associated with the audio-video slices of the film and television work in order from low to high, for example.
2. For each grade in the ranking list, a bilingual spliced audio-video file of this grade is generated, and its duration is the same as the original input audio-video file including non-native language audio, but the presentation rule is: in the bilingual spliced audio-video file, for those audio-video slices having a grade equal to or smaller than a given grade, non-native language audio is presented, and for those audio-video slices having a grade larger than the given grade, native language audio is presented.
3. Storing the generated bilingual spliced audio-video files of each grade in a separate storage unit for users to choose.

In some embodiments, the solution of the present disclosure further relates to a computer storage medium on which executable instructions are stored. When the instructions are executed, the computer can execute the method described in FIG. 1, FIG. 2 or FIG. 3.

It should be understood that although English is used as the non-native language and Chinese is used as the native language for description in each embodiment, the combination of other languages is also applicable to the solution of this disclosure.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method for presenting a multimedia stream including a set of audio streams, wherein the set of audio streams comprise a first audio stream and a second audio stream having different content from the first audio stream, the method comprising:
   receiving the first audio stream, wherein the first audio stream comprises a set of first audio slices sequentially located in the first audio stream, wherein each first audio slice comprises a timestamp and a grade value;
   receiving the second audio stream, wherein the second audio stream comprises a set of second audio slices sequentially located in the second audio stream, wherein each of the second audio slice is aligned in time with one of the first audio slice;
   presenting the first audio stream according to the timestamp of the first set of first audio slices;
   receiving a set of control commands, wherein the set of control commands comprises a first threshold value;
   determining the first threshold value is lower than the grade value of the first audio slice;
   in response to the determination that the first threshold value is lower than the grade value of the first audio slice, presenting the second audio slice aligned with the first audio slice;
   wherein the set of control commands further comprises a time of usage value, the method further comprising:
   recording the time of presenting the multimedia stream;
   updating the time of usage value based on the time of presenting the multimedia stream;
   determining the time of usage value is greater than a predetermined third value; and
   in response to the determination that the time of usage value is greater than the predetermined third value, updating the first threshold value to a higher value.

2. The method of claim 1, wherein the set of control commands comprises a second threshold value greater than the first threshold value, the method further comprises:
   determining whether the second threshold value is greater than the grade value of the first audio slice; and
   in response to the determination that the second threshold value is greater than the grade value of the first audio slice, receiving a third audio slice.

3. The method of claim 2, wherein the set of control commands comprises a time of interaction value, the method further comprising:
   recording a duration time of the third audio slice; and
   updating the time of interaction value based on the duration time of the third audio slice.

4. The method of claim 3, further comprising:
   determining whether the time of interaction value is greater than a predetermined first value; and
   in response to the determination that the time of interaction value is greater than the predetermined first value, updating the first threshold value to a higher value.

5. The method of claim 2, further comprising:
   determining whether the third audio slice matches with the first audio slice;
   in response to the determination that the third audio slice matches with the first audio slice, updating the first threshold value to a higher value.

6. The method of claim 2, wherein the set of control commands comprises a counter value, the method further comprising:
   determining whether the third audio slice matches with the first audio slice;
   in response to the determination that the third audio slice matches with the first audio slice, updating the counter value.

7. The method of claim 6, further comprising:
   determining whether the counter value is greater than a predetermined second value;
   in response to the determination that the counter value is greater than the predetermined second value, updating the first threshold value to a higher value.

8. A system for presenting a multimedia stream including a set of audio streams, wherein the set of audio streams comprise a first audio stream and a second audio stream having different content from the first audio stream, the system comprising one or more processors configured to execute machine-readable instructions stored in a memory to cause the system to perform:

receiving the first audio stream, wherein the first audio stream comprises a set of first audio slices sequentially located in the first audio stream, wherein each first audio slice comprises a timestamp and a grade value;

receiving the second audio stream, wherein the second audio stream comprises a set of second audio slices sequentially located in the second stream, wherein each of the second audio slices is aligned in time with one of the first audio slices;

presenting the first audio stream according to the timestamp of the first set of first audio slices;

receiving a set of control commands, wherein the set of control commands comprises a first threshold value;

determining the first threshold value is lower than the grade value of the first audio slice;

in response to the determination that the first threshold value is lower than the grade value of the first audio slice, presenting the second audio slice aligned with the first audio slice;

wherein the set of control commands further comprises a time of usage value, the system further performs:

recording the time of presenting the multimedia stream;

updating the time of usage value based on the time of presenting the multimedia stream;

determining the time of usage value is greater than a predetermined third value; and in response to the determination that the time of usage value is greater than the predetermined third value, updating the first threshold value to a higher value.

9. The system of claim 8, wherein the set of control commands comprises a second threshold value greater than the first threshold value, the system is configured to further perform:

determining whether the second threshold value is greater than the grade value of the first audio slice; and in response to the determination that the second threshold value is greater than the grade value of the first audio slice, receiving a third audio slice.

10. The system of claim 9, wherein the system is configured to further perform:

determining whether the third audio slice matches with the first audio slice;

in response to the determination that the third audio slice matches with the first audio slice, updating the first threshold value to a higher value.

11. The system of claim 9, wherein the set of control commands comprises a counter value, and the system is configured to further perform:

determining whether the third audio slice matches with the first audio slice;

in response to the determination that the third audio slice matches with the first audio slice, updating the counter value.

12. The system of claim 11, wherein the system is configured to further perform:

determining whether the counter value is greater than a predetermined value;

in response to the determination that the third audio slice matches with the first audio slice, updating the first threshold value to a higher value.

\* \* \* \* \*